(12) United States Patent
Hiranandani et al.

(10) Patent No.: US 10,922,716 B2
(45) Date of Patent: Feb. 16, 2021

(54) CREATING TARGETED CONTENT BASED ON DETECTED CHARACTERISTICS OF AN AUGMENTED REALITY SCENE

(71) Applicant: Adobe Inc., San Jose, CA (US)

(72) Inventors: Gaurush Hiranandani, Karnataka (IN); Kumar Ayush, Jharkhand (IN); Chinnaobireddy Varsha, Telangana (IN); Sai Varun Reddy Maram, Telangana (IN)

(73) Assignee: ADOBE INC., San Jose, CA (US)

( * ) Notice: Subject to any disclaimer, the term of this patent is extended or adjusted under 35 U.S.C. 154(b) by 791 days.

(21) Appl. No.: 15/454,750

(22) Filed: Mar. 9, 2017

(65) Prior Publication Data
US 2018/0260843 A1    Sep. 13, 2018

(51) Int. Cl.
| | | |
|---|---|---|
| *G06Q 30/02* | (2012.01) | |
| *G06K 9/00* | (2006.01) | |
| *G06K 9/46* | (2006.01) | |
| *G06K 9/62* | (2006.01) | |
| *G06Q 30/06* | (2012.01) | |

(52) U.S. Cl.
CPC ..... *G06Q 30/0253* (2013.01); *G06K 9/00671* (2013.01); *G06K 9/4628* (2013.01); *G06K 9/6274* (2013.01); *G06Q 30/0255* (2013.01); *G06Q 30/0631* (2013.01)

(58) Field of Classification Search
None
See application file for complete search history.

(56) References Cited

U.S. PATENT DOCUMENTS

| | | |
|---|---|---|
| 8,606,645 B1 | 12/2013 | Applefeld |
| 9,449,342 B2 | 9/2016 | Sacco |
| 10,529,137 B1 | 1/2020 | Black et al. |

(Continued)

OTHER PUBLICATIONS

Kalkofen et al., "Interactive Focus and Context Visualization for Augmented Reality," 2007 6th IEEE and ACM International Symposium on Mixed and Augmented Reality, Nara, 2007, pp. 191-201, doi: 10.1109/ISMAR.2007.4538846. (Year: 2007).*

(Continued)

*Primary Examiner* — Christopher B Tokarczyk
(74) *Attorney, Agent, or Firm* — Keller Jolley Preece

(57) ABSTRACT

This disclosure generally covers systems and methods that identify objects within an augmented reality ("AR") scene (received from a user) to gather information concerning the user's physical environment or physical features and to recommend products. In particular, the disclosed systems and methods detect characteristics of multiple objects shown within an AR scene received from a user and, based on the detected characteristics, select products to recommend to the user. When analyzing characteristics, in some embodiments, the disclosed systems and methods determine visual characteristics associated with the real object or virtual object, such as color or location of an object. The disclosed systems and methods, in some embodiments, then select an endorsed product to recommend for use with the real object—based on the determined visual characteristics—and create a product recommendation that recommends the endorsed product.

20 Claims, 22 Drawing Sheets

(56) References Cited

U.S. PATENT DOCUMENTS

| | | | | |
|---|---|---|---|---|
| 2002/0045959 | A1* | 4/2002 | Van Overveld | G06Q 30/02 |
| | | | | 700/90 |
| 2012/0323910 | A1* | 12/2012 | Ilyas | G06F 16/9535 |
| | | | | 707/732 |
| 2013/0106910 | A1* | 5/2013 | Sacco | G06T 19/006 |
| | | | | 345/633 |
| 2014/0285522 | A1 | 9/2014 | Kim et al. | |
| 2014/0337174 | A1 | 11/2014 | Lin et al. | |
| 2015/0178786 | A1* | 6/2015 | Claessens | G06Q 30/0269 |
| | | | | 705/14.66 |
| 2016/0019618 | A1* | 1/2016 | Lin | G06K 9/00201 |
| | | | | 705/26.61 |
| 2018/0012411 | A1 | 1/2018 | Richey et al. | |

OTHER PUBLICATIONS

Inside Houzz: Introducing View in My Room' retrieved Jan. 24, 2018 from https://www.houzz.ie/magazine/ inside-houzz-introducing-view-in-my-room-stsetivw-vs-103238920 (Year: 2018).

U.S. Appl. No. 16/004,787, Aug. 2, 2019, Preinterview 1st Office Action.

U.S. Appl. No. 16/004,787, Sep. 20, 2019, Office Action.

Q Mei, J Guo, D Radev. DivRank: the interplay of prestige and diversity in information networks. Proceedings of the 16th ACM SIGKDD international conference on Knowledge discovery and data mining, 2010.

Gupta, Saurabh, et al. "Learning rich features from RGB-D images for object detection and segmentation." European Conference on Computer Vision. Springer International Publishing, 2014.

Ye, Jun, and Kien A. Hua. "Exploiting depth camera for 3d spatial relationship interpretation." Proceedings of the 4th ACM Multimedia Systems Conference. ACM, 2013.

Rishiraj Saha Roy et al. Automated Linguistic Personalization of Targeted Marketing Messages Mining UserGenerated Text on Social Media, Apr. 2015.

Lavneet Singh , Girija Chetty. Email Personalization and User Profiling Using RANSAC Multi Model Response Regression Based Optimized Pruning Extreme Learning Machines and Gradient Boosting Trees. International Conference on Neural Information Processing Systems, 2015.

Navdeep S. Sahni, S. Christian Wheeler and Pradeep Chintagunta. Personalization in Email Marketing: The Role of Self-Relevant Non-Informative Advertising Content, Jan. 30, 2016.

Shaoqing Ren, Kaiming He, Ross Girshick, Jian Sun. Faster R-CNN: Towards Real-Time Object Detection with Region Proposal Networks. Advances in Neural Information Processing Sytems (NIPS), 2015.

Naresh Boddeti, Vishnu, Takeo Kanade, and B. V. K. Vijaya Kumar. "Correlation filters for object alignment." Proceedings of the IEEE Conference on Computer Vision and Pattern Recognition. 2013.

Peter O'Donovan, Aseem Agarwala, Aaron Hertzmann, "Color Compatibility From Large Datasets" , ACM Transactions on Graphics, 2011, 30, 43, (Proc. SIGGRAPH).

Modani, Natwar et al. "Creating Diverse Product Review Summaries: A Graph Approach" International Conference on Web Information Systems Engineering, Dec. 25, 2015.

Girshick, Ross, et al. "Rich feature hierarchies for accurate object detection and semantic segmentation." Proceedings of the IEEE conference on computer vision and pattern recognition. 2014.

Jones, Donald R., Cary D. Perttunen, and Bruce E. Stuckman. "Lipschitzian optimization without the Lipschitz constant." Journal of Optimization Theory and Applications 79.1 (1993): 157-181.

Maureen Stone, Choosing Colors for Data Visualization, Jan. 17, 2006.

Tianyi Wu, Yuguo Chen and Jiawei Han. Association Mining in Large Databases: A Re-examination of Its Measures. 11th European Conference on Principles and Practice of Knowledge Discovery in Databases (2007).

Barilliance, Increasing Conversions with Retargeting Emails and Website Personalization, http://www.barilliance.com/wp-content/uploads/2015/09/Increasing-conversions-with-cart-abandonment-and-website-personalization.pdf, 2015.

Carly Stec, 6 Tips for Making the Most of Your Retargeting Campaigns, http://blog.hubspot.com/agency/retargeting-campaigns#sm.0000p5uh3wlw6eihxsd1a5wgivk90, May 18, 2015.

Ray-Ban Virtual Mirror, http://www.ray-ban.com/india/virtual-mirror, as accessed Jan. 19, 2017.

Heather Pemberton Levy, Five Key Trends in Gartner's 2015 Digital Marketing Hype Cycle, http://www.gartner.com/smarterwithgartner/five-key-trends-in-gartners-2015-digital-marketing-hypecycle, Oct. 14, 2015.

TextilWirtschaft, Goertz Virtual Shoe Fitting, https://www.youtube.com/watch?v=silya3JSpEU, Jun. 1, 2012.

Julie Hopkins, Adam Sarner "Market Guide for Email Marketing", Nov. 30, 2015.

"Augmented/Virtual Reality revenue forecast revised to hit $120 billion by 2020," http://www.digi-capital.com/news/2016/01/augmentedvirtual-reality-revenue-forecast-revised-to-hit-120-billion-by-2020/ dated Jan. 13, 2016.

Papagiannis, H., "Announcing: Augmented Human: How Technology is Shaping the New Reality," https://augmentedstories.com/page/2/ dated May 31, 2015.

"Augmented and Virtual Reality Devices to Become a $4 Billion-Plus Business in Three Years," http://www.ccsinsight.com/press/company-news/2251-augmented-and-virtual-reality-devices-to-become-a-4-billion-plus-business-in-three-years, retrieved Jul. 26, 2018.

"All the needles you want in a really, really big haystack," https://www.advertising.com/advertiser/targeting, retrieved Jul. 26, 2018.

Weng, Sung-Shun, and Mei-Ju Liu. "Personalized product recommendation in e-commerce." e-Technology, e-Commerce and e-Service, 2004. EEE'04. 2004 IEEE International Conference on. IEEE, 2004.

Grbovic, Mihajlo, et al. "E-commerce in Your Inbox: Product Recommendations at Scale." Proceedings of the 21th ACM SIGKDD International Conference on Knowledge Discovery and Data Mining. ACM, 2015.

http://vuforia.com/ retrieved Jul. 26, 2018.

https://unity3d.com/ retrieved Jul. 26, 2018.

M. Aubry, D. Maturana, A. Efros, B. Russell and J. Sivic. "Seeing 3D chairs: exemplar part-based 2D-3D alignment using a large dataset of CAD models". CVPR, 2014.

Tiangiang Liu, Aaron Hertzmann, Wilmot Li and Thomas Funkhouser. "Style Compatibility for 3D Furniture Models". ACM Transactions on Graphics, Aug. 2015.

Kulis, B. "Metric learning: A survey". Foundations & Trends in Machine Learning. 2012.

Joachims, T. Optimizing Search Engines using Clickthrough Data. Proceedings of the ACM Conference on Knowledge Discovery and Data Mining, 2003.

https://pypi.python.org/pypi/Pillow/2.1.0 dated Jul. 2, 2013.

Zhaoliang Lun, Evangelos Kalogerakis, Alla Sheffer. Elements of Style: Learning Perceptual Shape Style Similarity. ACM Transactions on Graphics (Proc. ACM SIGGRAPH 2015).

U.S. Appl. No. 15/972,815, filed Feb. 13, 2020, Office Action.

U.S. Appl. No. 16/004,787, filed Mar. 9, 2020, Office Action.

\* cited by examiner

| Relative Position of Virtual Object to Real Object | Surface Position of VB 502 and RB 500 |
|---|---|
| Front | VB 502 lies completely below RB 500 without any overlap |
| | VB 502 lies within the two vertical edges of RB 500 such that vir_center_y > obj_y1 |
| | VB 502 overlaps with RB 500, and vir_center_y > obj_y2 |
| | VB 502 overlaps with RB 500, the center of VB 502 lies in between the horizontal edges of RB 500, and obj_x1 < aug_center_x < obj_x2 |
| Back | VB 502 lies completely above RB 500 without any overlap |
| | VB 502 lies within the two vertical edges of RB 500 such that vir_center_y < obj_y1 |
| | VB 502 overlaps with RB 500, and vir_center_y < obj_y2 |
| Left | VB 502 lies completely to the left of RB 500 such that vir_y1 < obj_y2 and vir_y1 > obj_y1 (no overlap) |
| | VB 502 lies completely to the left of RB 500 such that vir_y2 > obj_y2 and vir_y1 < obj_y1 (no overlap) |
| | VB 502 overlaps with RB 500, the center of VB 502 lies in between the horizontal edges of RB 500, and vir_center_x < obj_x1 |
| Right | VB 502 lies completely to the right of RB 500 such that vir_y1 < obj_y2 and vir_y1 > obj_y1 (no overlap) |
| | VB 502 lies completely to the left of RB 500 such that vir_y2 > obj_y2 and vir_y1 < obj_y1 (no overlap) |
| | VB 502 overlaps with RB 500, the center of VB 502 lies in between the horizontal edges of RB 500, and vir_center_x > obj_x2 |

*Fig. 5B*

| Real-Object Tuples for Hue | Real-Object Tuples for Shade |
|---|---|
| <sofa, purple, front> | <sofa, Medium Orchid, front> |
| <sofa, purple, after> | <sofa, Medium Orchid, after> |
| <sofa, purple, anterior> | <sofa, Medium Orchid, anterior> |

*Fig. 6*

We want you to check out this _purple chair_ if placed _in front of_ your _purple sofa_.

Or, how about a _cyan chair_ to the _left_ of the _orange chair_ in your home?

In fact, this green chair will look amazing if placed next to your brown potted-plant.

A red chair to the right of your pumpkin-orange chair is a perfect combination too.

CREATING TARGETED CONTENT BASED ON DETECTED CHARACTERISTICS OF AN AUGMENTED REALITY SCENE

BACKGROUND

Digital content providers, digital publishers, and digital marketers increasingly seek techniques for creating targeted content that personalizes communications for users based on available information about the users. Such targeted content comes in various forms. For example, some digital publishers and marketers create targeted content by inserting a user's name (extracted from a user profile) into an email, pop-up advertisement, or another digital message. Other digital marketers create targeted content by, for example, adjusting content of a message based on a device's location data, such as information extracted from a web browser or an IP address connected to the user's device. Still other digital marketers contextualize content by identifying adjectives or adverbs from social media posts and inserting the identified adjectives or adverbs into advertisements.

In addition to extracting information from a device or from software running on the device, digital publishers and marketers commonly create targeted content based on a user's web-browsing data. For example, some conventional techniques of contextualized content delivery include selecting content based on a user's web-browsing history (e.g., URL addresses visited by a user) or prior e-commerce transactions (e.g., products purchased through a website or mobile application).

While the use of web-browsing data for targeting content to users can enable marketers to provide relevant information, the use of web-browsing data has various drawbacks. For example, users are often wary of providing information on the Internet and often intentionally provide false information. As such, targeted content based on web-browsing data can be inaccurate. Furthermore, targeted content based on web-browsing often fails to target aspects of user's lives, like their physical surroundings, not apparent from their digital footprint.

SUMMARY

This disclosure describes one or more embodiments of systems and methods that solve some, or all, of the foregoing or other problems as well as provide other benefits. To solve these and/or other problems, the disclosed systems and methods identify objects within an augmented reality ("AR") scene to gather information concerning the user's physical environment or physical features. In particular, the disclosed systems and methods detect characteristics of multiple objects shown within an AR scene and, based on the detected characteristics, generate targeted content for a user.

For example, in certain embodiments, the disclosed systems and methods identify a real object and a virtual object within an AR scene. Based on visual information from the AR scene, the disclosed systems and methods determine visual characteristics associated with the real object or virtual object, such as color or location of an object. The disclosed systems and methods then select an endorsed product to recommend for use with the real object—based on the determined visual characteristics—and create a product recommendation that recommends the endorsed product.

By analyzing visual information of an AR scene and determining visual characteristics of objects within that scene, the disclosed systems and methods do what many conventional techniques of contextualized content delivery cannot—detect a user's physical environment or physical features. In some embodiments, the systems and methods likewise analyze the determined visual characteristics and potential endorsed products to provide product recommendations with customization that is unmatched by conventional techniques of targeted advertising.

Additional features and advantages of one or more embodiments of the present disclosure will be set forth in the following description and will in part be obvious from the description or may be learned by the practice of the disclosed embodiments.

BRIEF DESCRIPTION OF THE DRAWINGS

The detailed description refers to the drawings briefly described below.

FIG. 5B illustrates a position-correlation table in accordance with one or more embodiments.

FIG. 6 illustrates a real-object-tuple table in accordance with one or more embodiments.

DETAILED DESCRIPTION

This disclosure describes one or more embodiments of an augmented reality ("AR") analysis platform that identifies objects within an AR scene (received from a user's client device) to gather information concerning the user's physical environment or physical features and to generate targeted content based on the gathered information. In particular, the disclosed AR analysis platform detects characteristics of multiple objects shown within an AR scene (received from a user's client device) and, based on the detected characteristics, selects products to recommend to the user.

For example, in certain embodiments, the disclosed AR analysis platform identifies a real object and a virtual object within an AR scene. Based on visual information from the AR scene, the AR analysis platform determines visual characteristics associated with the real object or virtual object, such as color or location of an object. The AR analysis platform then selects an endorsed product to recommend for use with the real object—based on the determined visual characteristics—and creates a product recommendation that recommends the endorsed product.

By analyzing visual information of an AR scene and determining visual characteristics of objects within that scene, the disclosed AR analysis platform does what many conventional techniques of contextualized content delivery cannot—detects a user's physical environment or physical features. In some embodiments, for example, the AR analysis platform analyzes the determined visual characteristics and various potential endorsed products to provide product recommendations with customization that is unmatched by conventional techniques of contextualized advertising.

Additionally, by analyzing real objects or features within an AR scene, the AR analysis platform (in some embodiments) generates product recommendations related specifically to a physical object within a user-created AR scene. For example, the AR analysis platform creates product recommendations that comprise endorsed products compatible with the color and and/or location of a real object within the AR scene. In some such embodiments, the AR analysis platform delivers product recommendations that specifically suggest how to pair or use an endorsed product within a user-created AR scene.

In some embodiments, the AR analysis platform provides customized recommendations that target not only objects within a user-created AR scene, but also compliment different viewpoints or objects inserted within the AR scene. By analyzing the objects, viewpoints, or selections within a user's AR scene, the AR analysis platform (in some embodiments) creates product recommendations that direct an AR client application to show endorsed products that a user can, for example, try on virtually (e.g., suggested clothing or accessories for a user within an AR scene) or place virtually within an AR scene (e.g., suggested furniture within an AR scene of a specific room or environment).

Figure 1C:
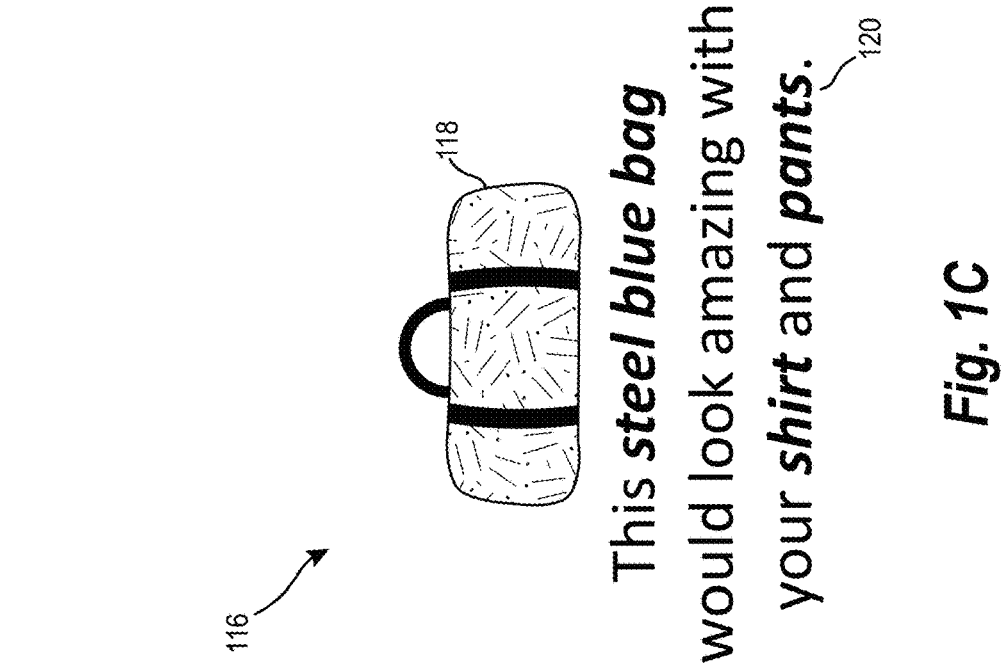
FIG. 1C illustrates a product recommendation in accordance with one or more embodiments.
Figure 1B:
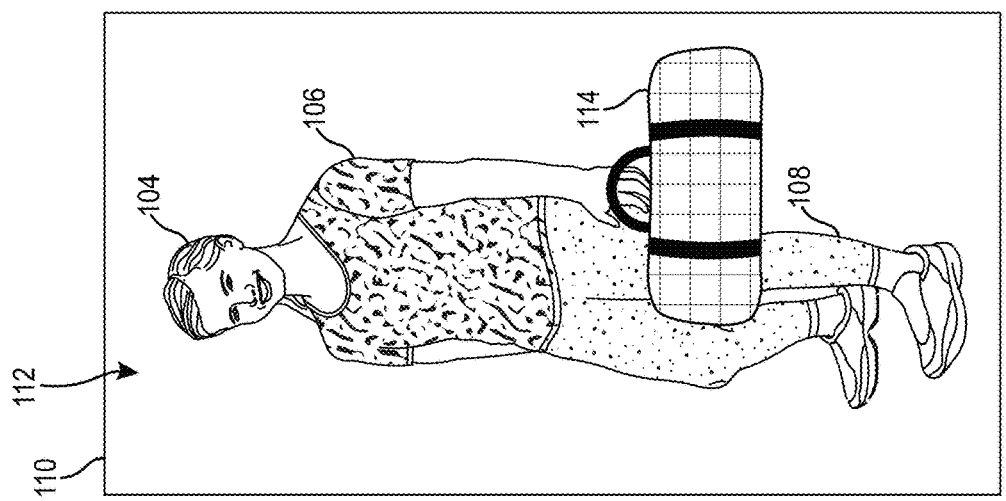
FIGS. 1A-1B illustrate a digital image of a real scene and a screenshot of an augmented reality ("AR") scene, respectively, in accordance with one or more embodiments of an AR analysis platform.
Figure 1A:
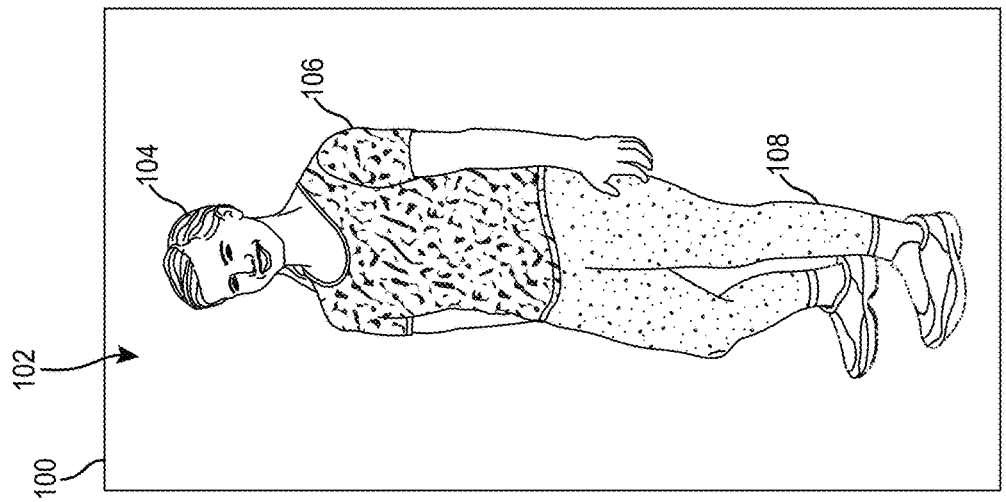

Turning now to the figures, FIGS. 1A-1C provide an overview of a process by which an AR analysis platform creates a product recommendation that recommends an endorsed product—based on an analysis of real and virtual objects within an AR scene. FIGS. 1A and 1B respectively illustrate a digital image of a real scene (including real objects) and a screenshot of an AR scene (including real objects and a virtual object). As suggested above, in some embodiments, the AR analysis platform analyzes digital images to identify the real objects in the real scene (and, consequently, the corresponding AR scene) and to identify the virtual object in the AR scene. The AR analysis platform further determines visual characteristics associated with the real objects or the virtual object to create a product recommendation that recommends an endorsed product for use with one or more of the real objects. FIG. 1C illustrates one example of such a product recommendation.

The description of FIGS. 1A-1C above and below merely provide an overview of a general process of the AR analysis platform. The disclosure provides further description and additional embodiments of the AR analysis platform with reference to the other figures below. To facilitate describing FIGS. 1A-1C and the AR analysis platform, however, this disclosure provides the following definitions.

As used herein, the term "real object" refers to a physical object that exists in the physical world. For example, a real object may include, but is not limited to, accessories, animals, clothing, cosmetics, footwear, fixtures, furnishings, furniture, hair, people, physical human features, vehicles, or any other physical object that exists outside of a computer. In some embodiments, a digital image depicts real objects within an AR scene.

By contrast, the term "virtual object" refers to a computer-generated graphical object that does not exist in the physical world. For example, a virtual object may include, but is not limited to, an object created by a computer during a user's AR session, such as virtual accessories, animals, clothing, cosmetics, footwear, fixtures, furniture, furnishings, hair, people, physical human features, vehicles, or any other graphical object created by a computer. This disclosure will generally use the word "virtual" to designate specific virtual objects (e.g., "virtual bench," "virtual bag"), but will generally refer to real objects without the word "real" (e.g., "car," "shoe").

Relatedly, the term "AR scene" refers to an augmented view of the real world comprising real objects with at least one computer-generated object superimposed on (or integrated within) the view of the real world. To illustrate, an AR scene may comprise an augmented view of a real room containing real walls, lights, carpet, furniture, and people, as well as a virtual chair superimposed on top of the real carpet. A client device may generate an AR scene, for example, by generating a dynamic, digital, three-dimensional view of the real room with the virtual chair superimposed on (or integrated within) the real room. To illustrate another example, an AR scene may comprise a dynamic, digital, three-dimensional view of a real playground containing real grass, paths, swing sets, slides, and towers, as well as virtual benches superimposed on top of the grass. The real-room and real-playground scenes are merely examples. A person having ordinary skill in the art will recognize that an AR scene may comprise an augmented view of any real environment and comprise any real or virtual object, including, but not limited to, the example objects listed above.

By contrast, the term "real scene" refers to a view of the real world comprising real objects. For example, a real scene may comprise a view of a real park that includes a real dog sitting on real grass. A client device may generate a real scene, for example, by generating a dynamic, digital, three-dimensional view of the real park. A real scene may likewise comprise any real object, including, but not limited to, the example real objects listed above. A real scene, however, lacks virtual objects.

Relatedly, the term "AR session" refers to a particular user's or client device's use of an application to generate one or more AR scenes. An AR session typically includes a start and end of use, such as executing an application on a smart phone (or accessing a website within a browser) to generate an AR scene using the application (or website) until the application (or website) ceases to generate or display the AR scene. For example, an AR session would include a client device's initial generation of a dynamic, digital, three-dimensional view of an AR scene (with a superimposed or integrated virtual object) until the client device ceases to capture and display digital images that underlie the AR scene.

The term "AR session data" refers to data representing digital images, metadata, virtual objects, user interactions, device orientation, accelerometer data, gyroscopic measurements, or other data related to an AR session. For example, AR session data includes digital images captured by a client device that depict a real scene and that underlie an AR scene. As another example, AR session data includes metatags for a virtual object superimposed on digital images to identify the virtual object's color, position, object type, product name, or other characteristics. As yet another example, AR session data includes gyroscopic data indicating a client device's orientation and time data indicating a period for which a user held a client device at a specific orientation or held the client device without motion.

FIG. 1A illustrates a digital image 100 of a real scene 102 comprising real objects. In particular, a client device generates the real scene 102 within a graphical user interface (of the client device) while running an AR client application. As discussed below, the AR client application enables a user to insert virtual objects into a real scene to create an AR scene. As shown in FIG. 1A, however, the real scene 102 does not contain any virtual objects. Rather, the real scene 102 comprises depictions of various real objects, including a woman 104, a shirt 106, and pants 108.

To create the digital image 100 illustrated by FIG. 1A, the client device captures the digital image 100 of the real scene 102 using a camera when, for example, a user adjusts the orientation of the client device while the client device executes the AR client application. Accordingly, the digital image 100 is one of many digital images captured by the client device while the client device generates a dynamic, digital, three-dimensional depiction of an AR scene within a graphical user interface. The digital image 100 thus provides a potential viewpoint from which the AR analysis platform analyzes real objects for purposes of providing a product recommendation and from which a user considers virtual objects.

As used in this disclosure, the term "production recommendation" refers to any digital message that recommends an endorsed product, including, but not limited to, a digital advertisement, email, video, voice message, text, or signal to insert a virtual object within an AR scene. For example, a production recommendation may include a digital advertisement shown within a graphical user interface that encourages a particular user to purchase an endorsed product and that recommends the endorsed product for use with a real object from an analyzed AR scene. As another example, a product recommendation includes a digital message to a client device to insert a specific virtual object representing an endorsed product within an AR scene.

FIG. 1B illustrates a screenshot 110 of an AR scene 112 comprising real objects and a virtual object. In particular, the screenshot 110 includes a virtual bag 114 and the real objects mentioned above-including the woman 104, the shirt 106, and the pants 108. The AR client application causes the client device to generate the virtual bag 114 superimposed on (or, alternatively, integrated within) the real scene 102 while executing the AR application. Once the client device generates and superimposes the virtual bag 114, the real scene 102 becomes the AR scene 112. Moreover, by generating the virtual bag 114, the client device provides the AR scene as a viewpoint from which a user considers the virtual bag 114 together with the shirt 106 and the pants 108 during an AR session. While FIG. 1B depicts the screenshot 110, in other embodiments, the AR analysis platform analyzes any other form of digital image of an AR scene.

As noted above, the AR analysis platform analyzes objects within the digital image 100 and the screenshot 110. For example, in some embodiments, the AR analysis platform analyzes the visual information of the digital image 100 to identify the shirt 106 (as a shirt) and to identify the pants 108 (as pants). In some such embodiments, for instance, the AR analysis platform applies a region proposal algorithm (from a detection network) to object proposals within the digital image 100 to produce object labels for the shirt 106 and the pants 108. This disclosure will describe embodiments that generate object labels in more detail below.

Additionally, in some embodiments, the AR analysis platform analyzes visual information of the digital image 100 or the screenshot 110 to determine visual characteristics of the shirt 106, pants 108, or virtual bag 114. For example, in certain embodiments, the AR analysis platform analyzes the visual information of the digital image 100 to determine a color of some of the real objects—the shirt 106 and the pants 108. In some embodiments, for instance, the AR analysis platform determines a dominant color within an object proposal (such as a bounding box) surrounding the shirt 106 and an object proposal (such as a bounding box) surrounding the pants 108.

By analyzing the visual information of the digital image 100, the AR analysis platform may determine, for example, that the shirt 106 is ivory in color and that the pants 108 are light grey in color. As shown in FIGS. 1A and 1B, a speckled pattern covering the shirt 106 indicates that the shirt 106 is ivory in color, and a varying-size-dot pattern covering the pants 108 indicates that the pants 108 are light grey in color. Similarly, a grid pattern covering the virtual bag 114 indicates that the virtual bag 114 is forest green in color.

The AR analysis platform does not determine the color of the virtual bag 114 in the same way as real objects. Because the virtual bag is computer generated and assigned (or predetermined to have) a color, in some embodiments, the AR analysis platform identifies a metatag within AR session data to determine a color of the virtual bag 114.

In addition to determining the color of real objects, in some embodiments, the AR analysis platform determines additional visual characteristics, such as a relative position of a virtual object with respect to the real objects. For example, in certain embodiments, the AR analysis platform determines that (as shown in FIG. 1B) the virtual bag 114 is below the shirt 106 and that the virtual bag 114 is in front of the pants 108. In some such embodiments, the AR analysis platform uses object proposals for each of the shirt 106, the pants 108, and the virtual bag 114 to determine a relative position of the virtual bag 114.

After determining various visual characteristics, the AR analysis platform optionally determines whether potential endorsed products are compatible with one or more of the real objects. The term "endorsed product" refers to a product that is promoted or sold by a digital content provider, digital publisher, digital marketer, or other entity. An endorsed product, for example, includes any real or virtual object that is sold or promoted by a website or application, including, but not limited to, accessories, animals, clothing, cosmetics, footwear, fixtures, furnishings, furniture, physical enhancements, and vehicles. In some embodiments, for example, the AR analysis platform determines whether the determined colors of the real objects are compatible with any one of several potential endorsed products or, alternatively, whether some other characteristic of the real objects are compatible with any one of several potential endorsed products.

Using color compatibility as an example, in some embodiments, the AR analysis platform may determine color compatibility of various color combinations comprising one of the colors of the real objects and one of the colors of potential endorsed products (e.g., by applying a regression analysis to generate color-compatibility scores based on color palettes that include the various color combinations). Such endorsed products may include the virtual bag 114 and a virtual bag 118 (shown in FIG. 1C). As shown in FIG. 1C, a line-and-dot pattern covering the virtual bag 118 indicates that the virtual bag 118 is steel blue in color. Accordingly, the AR analysis platform may determine color compatibility for each of a first combination of the ivory (for the shirt 106) and the forest green (for the virtual bag 114), a second combination of the light grey (for the pants 108) and the forest green (for the virtual bag 114), a third combination of the ivory (for the shirt 106) and a steel blue (for the virtual bag 118), and a fourth combination of the light grey (for the pants 108) and the steel blue (for the virtual bag 118).

Based on the visual characteristics and/or compatibility determinations, in some embodiments, the AR platform selects one or more endorsed products to recommend for use with one or more of the real objects. Continuing the example shown in FIGS. 1A-1C, the AR platform may select the virtual bag 118 as the most compatible endorsed product for use with both the shirt 106 and the pants 108. Upon selecting an endorsed product, in some embodiments, the AR platform creates a product recommendation that recommends the selected endorsed product. FIG. 1C illustrates one such product recommendation.

Specifically, FIG. 1C illustrates a product recommendation 116 that includes the virtual bag 118 and a recommendation message 120. As shown, the recommendation message 120 recommends the virtual bag 118 as an endorsed product for use with one or more real objects (i.e., the shirt 106 and the pants 108). The recommendation message 120 also specifies a color of the virtual bag 118 (i.e., steel blue). Additionally, and as shown in further examples below, a recommendation message may indicate a relative position of the endorsed product with respect to the real objects.

Turning now from the overview to further description and additional embodiments of the AR analysis platform. Before identifying objects in a digital image, in some embodiments, the AR analysis platform optionally determines a viewpoint of an AR scene. In other words, the AR analysis platform identifies a viewpoint (i.e., a screen shot of an AR scene) to analyze. When selecting a viewpoint, the AR analysis platform analyzes various viewpoints of an AR scene generated by a client device during an AR session using an AR client application. During an AR session, the AR client application causes the client device to generate multiple dynamic, digital, three-dimensional depictions of an AR scene within a graphical user interface. Each viewpoint of the AR scene provides a user with a different depiction of a virtual object together with real objects—but from different viewpoints of the AR scene. In an AR session with different viewpoints, a user may consider a virtual object as a potential product for use with various real objects (e.g., for later purchase or to add to a wish list). In other words, each viewpoint of the AR scene allows a user to determine a compatibility of an endorsed product as depicted as a virtual object.

In some embodiments, to determine a viewpoint to analyze, the AR analysis platform determines when a user (during an AR session) spends more time than a threshold timeframe on a given view point (e.g., without changing the virtual object's orientation and/or without moving the client device). Alternatively, the AR analysis platform identifies a viewpoint which remains fixed for the longest time during an AR session.

More particularly, the AR analysis platform determines an initial instant when the user spends more time than a threshold timeframe at a particular viewpoint without changing the virtual object's orientation and without moving the client device. For ease of reference, this disclosure refers to the viewpoint of the initial instant that exceeds the threshold timeframe as the "threshold-instant viewpoint." Alternatively, in some embodiments, the AR analysis platform determines when the user spends a longest time during an AR session at a particular viewpoint without changing the virtual object's orientation and without moving the client device. For ease of reference, this disclosure refers to the viewpoint at which the user spends a longest time without changing the virtual object's orientation and without moving the client device as the "longest-constant viewpoint." Depending on the embodiment, the AR analysis platform selects—as a viewpoint that interests the user—the threshold-instant viewpoint or the longest-constant viewpoint. In any event, upon identifying the viewpoint, the AR analysis platform can capture a screen shot of the viewpoint to analyze.

Figure 2A:
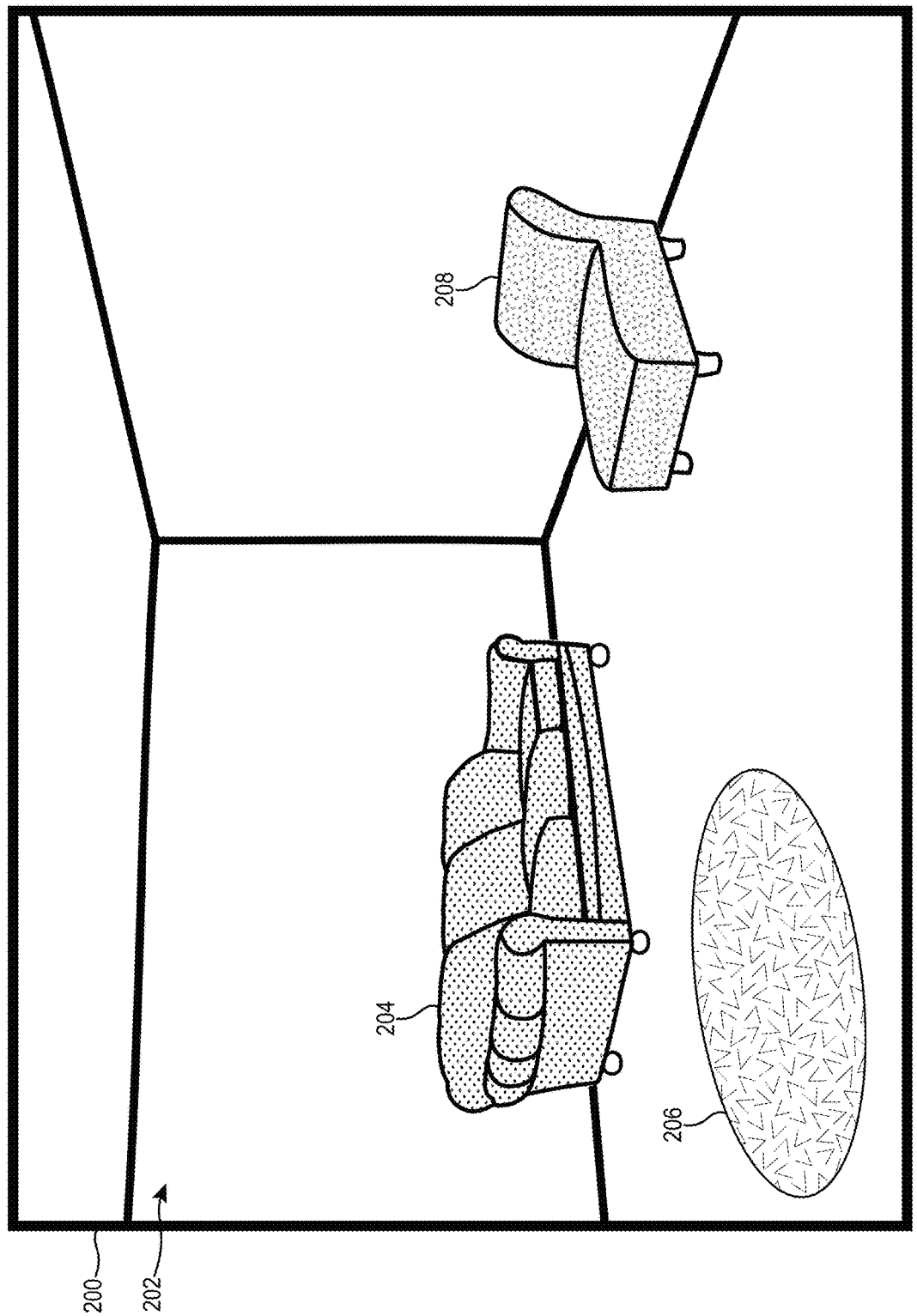
FIG. 2A-2B illustrate a digital image of a real scene and a screenshot of an AR scene, respectively, in accordance with one or more embodiments.
Figure 2B:
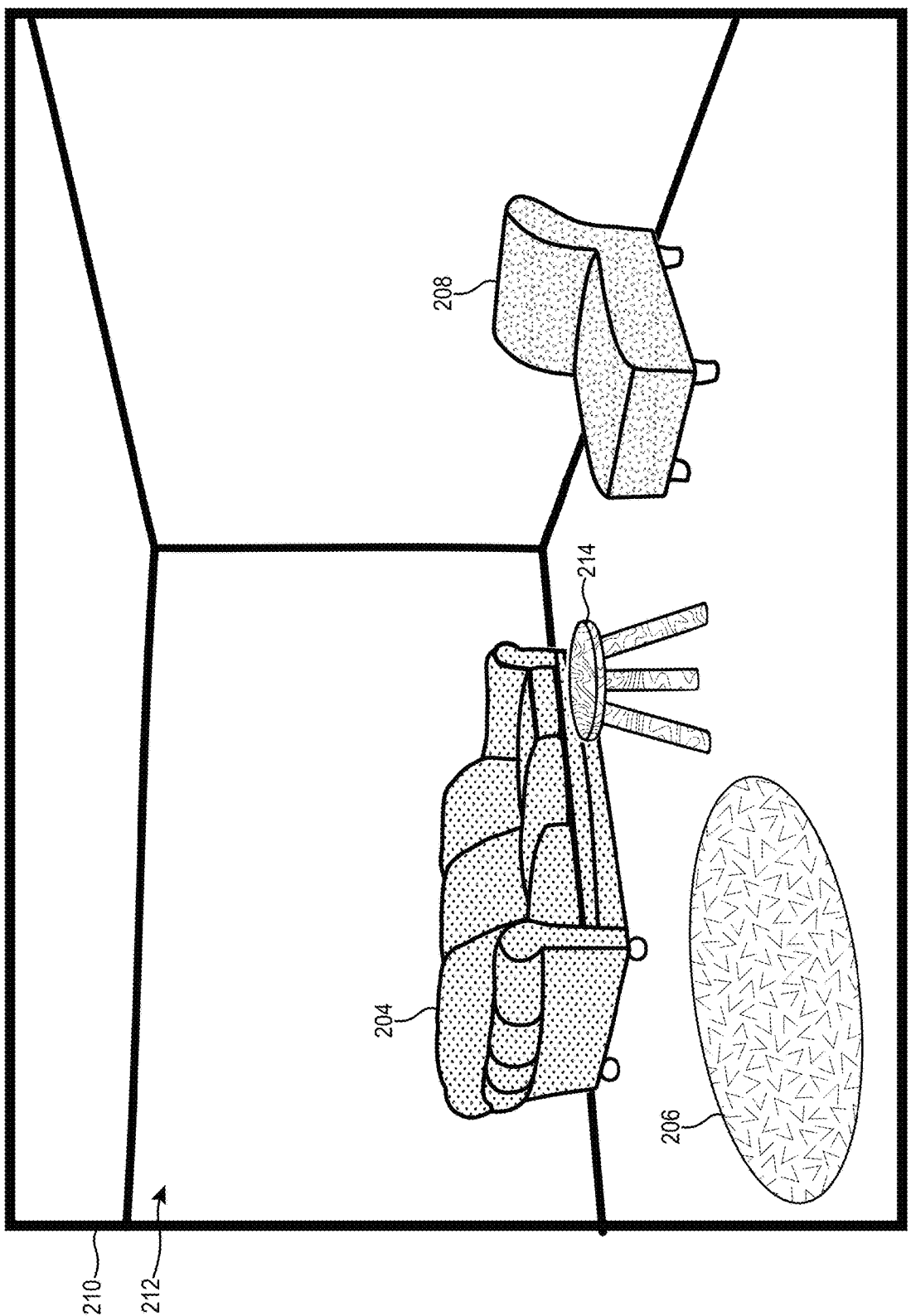

Turning now to the Figures to aid in description of viewpoints, FIGS. 2A and 2B respectively illustrate a digital image of a viewpoint of a real scene that interests a user and a screenshot of the same viewpoint (but with a virtual object within an AR scene) that interests the user. Specifically, FIG. 2A illustrates a digital image 200 of a real scene 202 that interests the user and that comprises real objects. The real objects include a sofa 204, a rug 206, and a chair 208. A polka-dot pattern covering the sofa 204 indicates that the sofa 204 is purple in color. Similarly, a chevron pattern covering the rug 206 indicates that the rug 206 is yellow in color. Additionally, a double-short-line pattern covering the chair 208 indicates that the chair 208 is orange in color. The digital image 200 represents a viewpoint that interests the user—such as threshold-instant viewpoint or a longest-constant viewpoint—as determined by the AR analysis platform using one or more of the embodiments described above.

FIG. 2B illustrates a screenshot 210 of an AR scene 212 that comprises real objects and a virtual object. In particular, the screenshot 210 includes a virtual stool 214 and the real objects mentioned above—including the sofa 204, the rug 206, and the chair 208. A wood-grain pattern covering the virtual stool 214 indicates that the virtual stool 214 is brown in color. Similar to the digital image 200, the screenshot 210 represents the same viewpoint that interests the user—such as the threshold-instant viewpoint or the longest-constant viewpoint—as determined by the AR analysis platform using one or more of the embodiments described above. But the digital image 200 further includes the virtual stool 214, which transforms the real scene into an AR scene.

In other words, the digital image 200 is a digital image captured by a client device at a viewpoint that interests the user, while the screenshot 210 is a screenshot of the same viewpoint with the virtual stool 214 superimposed (or integrated within) on the digital image 200. Accordingly, when the AR analysis platform identifies, detects characteristics of, or otherwise analyzes real objects within a digital image of a real scene—that has a same viewpoint as a screenshot of a corresponding AR scene—the AR analysis platform likewise identifies, detects characteristics of, or otherwise analyzes within a screenshot of the AR scene.

Regardless of whether or how the AR analysis platform determines a viewpoint of an AR scene that interests a user, in some embodiments, the AR analysis platform identifies real objects and/or virtual objects within an AR scene. For instance, in some embodiments, the AR analysis platform determines an object label for various real objects within a selected viewpoint of an AR scene. In some such embodiments, the AR analysis platform analyzes a digital image of a real scene that captures the same viewpoint as the AR scene of interest (such as the digital image 200 of the real scene 202 illustrated in FIG. 2A, which corresponds to and captures the same viewpoint as the screenshot 210 of the AR scene 212 illustrated in FIG. 2B).

To illustrate, in certain embodiments, the AR analysis platform uses a Convolutional Neural Network ("CNN") to determine an object proposal, object label, and an object-label-confidence score for various real objects within a digital image of a real scene, where the real scene corresponds to an AR scene. In some such embodiments, for instance, the AR analysis platform inputs a digital image of a real scene corresponding to an AR scene of the same viewpoint—such as the digital image 200—into a CNN. The nodes of the CNN include and apply region proposal algorithms to real objects within the digital image to produce an object proposal, object label, and an object-label-confidence score for various real objects within a digital image. As used herein, an "object proposal" identifies a location of an object within an image (e.g., by coordinates in a graph). An "object label" identifies a class of object (e.g., by assigning a label of car, chair, couch, shirt). An "object-label-confidence score" represents a measure of confidence in the object label determined for a particular object (e.g., measured by percentage or some other value).

In some embodiments, the AR analysis platform uses (as a CNN) a Region-based Convolutional Neural Network ("R-CNN"), as described by Ross Girshick, Jeff Donahue, Trevor Darrell, and Jitendra Malik, "Rich feature hierarchies for accurate object detection and semantic segmentation," Proceedings of the IEE Conference on Computer Vision and Pattern Recognition (2014), the entire contents of which are hereby incorporated by reference. Additionally, or alternatively, the AR analysis platform uses (as a CNN) a Region Proposal Network ("RPN"), as described by Shaoquin Ren, Kaiming He, Ross Girshick, and Jian Sun, "Faster R-CNN: Towards Real-Time Object Detection with Region Proposal Networks" Advances in Neural Information Processing Systems (NIPS) (2015), the entire contents of which are hereby incorporated by reference.

Among other things, in some embodiments, an R-CNN includes an RPN that shares full-image convolutional features—such as convolutional layers—with a detection network. When the R-CNN includes an RPN, the AR analysis platform trains the RPN to generate high-quality region proposals (also called object proposals) that the R-CNN uses to detect objects. Additionally, in some embodiments, the AR analysis platform uses a CNN that merges an RPN and a R-CNN into a single CNN by sharing each network's convolutional features. In such embodiments, the RPN identifies (for the single, merged CNN) which regions to analyze to identify objects.

As noted above, the AR analysis platform uses a CNN to identify a location of real objects within a digital image. In some embodiments, the AR analysis platform uses a CNN that produces object proposals comprising a pair of coordinates marking a location of an object within a digital image. For example, a CNN may produce coordinates representing corners of a bounding box. As used herein, the term "bounding box" refers to an object proposal comprising a pair of coordinates that identifies a location of an object within an image, including screenshots and other digital images.

Figure 3A:
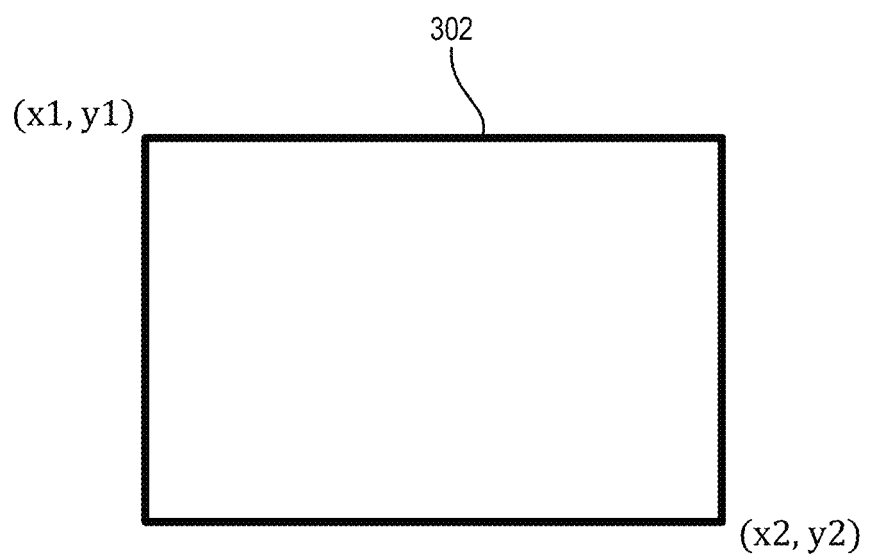
FIG. 3A illustrates a bounding box in accordance with one or more embodiments.

FIG. 3A illustrates a representation of a bounding box 302. As shown in FIG. 3A, the bounding box 302 includes coordinate pair (x1, y1) and coordinate pair (x2, y2). The coordinate pair (x1, y1) identifies a top-left corner of the bounding box 302, while the coordinate pair (x2, y2) identifies a bottom-right corner of the bounding box 302. As shown in FIG. 3A, the bounding box 302 represents one object proposal for a location of an object. In some embodiments, the AR analysis platform uses a CNN (e.g., R-CNN and/or RPN) to produce a pair of coordinates for each of various real objects within a digital image. The CNN, however, does not typically produce a visual representation of a bounding box, as shown in FIG. 3A.

Figure 3B:
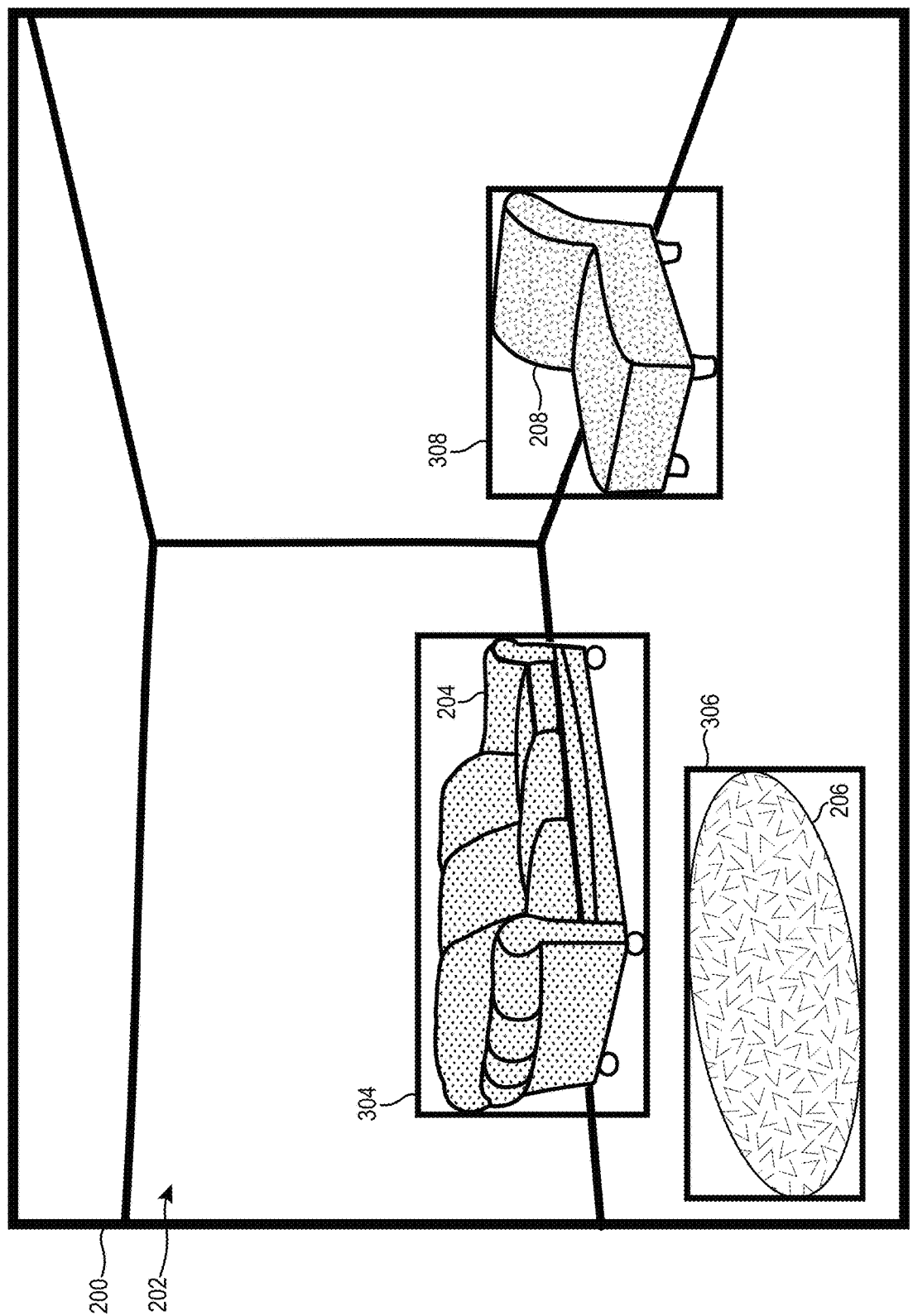
FIGS. 3B-3C illustrate a digital image of a real scene and a screenshot of an AR scene, respectively, where the digital image and the screenshot comprise bounding boxes in accordance with one or more embodiments.

FIG. 3B similarly illustrates the digital image 200 of the real scene 202 comprising bounding boxes corresponding to various real objects. For example, a bounding box 304 corresponds to the sofa 204, a bounding box 306 corresponds to the rug 206, and a bounding box 308 corresponds to the chair 208. As indicated by FIG. 3B, the AR analysis platform inputs the digital image 200 into a CNN (e.g., R-CNN and/or RPN) that produces object proposals comprising pairs of coordinates that each represent a bounding box depicted in FIG. 3B. In this particular embodiment, the CNN does not produce a visual representation of bounding boxes 306, 308, and 310, but rather produces pairs of coordinates that each represent one of the bounding boxes 306, 308, or 310. In some embodiments, however, the AR analysis platform generates a digital image comprising visual representations of bounding boxes, such as the digital image 200 shown in FIG. 3B.

As suggested above, in addition to producing object proposals for the real objects shown in digital image 200, in some embodiments, the AR analysis platform inputs the digital image 200 into a CNN that produces an object label and an object-label-confidence score for some or all of the real objects shown in FIG. 3B. For example, in one such embodiment, the AR analysis platform inputs the digital image 200 into a CNN that produces an object label of "couch" for the sofa 204, with an object-label-confidence score of 0.75; an object label of "rug" for the rug 206, with an object-label-confidence score of 0.65; and an object label of "chair" for the chair 208, with an object-label-confidence score of 0.81.

Additionally, in some embodiments, the AR analysis platform aggregates object proposals, object labels, and object-label-confidence scores produced by a CNN into a dataset. For example, in one such embodiment, the AR analysis platform aggregates various outputs of a CNN into a dataset corresponding to each produced bounding box. To illustrate, let B be a set of all bounding boxes (i.e., pairs of coordinates) within a digital image, and n be a number of bounding boxes output by a CNN. Given such variables, the AR analysis platform generates the following dataset:

$$B=\{b_1, b_2, \ldots, b_n\}$$

In the dataset above, each bounding box $b_i$ comprises an object label $l_i$ and an object-label-confidence score $c_i$. As explained below, in some embodiments, the AR analysis platform stores the dataset in a data storage and uses B to perform further analyses.

In addition to identifying real objects within an AR scene, in some embodiments, the AR analysis platform identifies a virtual object and/or determines a location of the virtual object within an AR scene. For example, in some embodiments, the AR analysis platform receives AR session data from a client device that identifies an object label of various virtual objects within a selected viewpoint of an AR scene (e.g., a metatag of a virtual object that identifies the object type of the virtual object). Additionally, in some embodiments, the AR analysis platform uses a CNN to identify an object label for various virtual objects within a digital image of an AR scene, consistent with the disclosure above.

To determine a location of a virtual object within an AR scene, the AR analysis platform uses various deterministic methods or probabilistic models. For example, in certain embodiments, the AR analysis platform receives AR session data (from a client device) that includes location data indicating a location (by coordinates) of a virtual object throughout an AR session within an AR scene. In some cases, the AR session data indicates a pair of coordinates representing a bounding box corresponding to the virtual object, such as the coordinate pairs illustrated in FIG. 3A. Additionally, the AR analysis platform optionally identifies and stores location data for a virtual object that is within a selected viewpoint of an AR scene, such as the viewpoint shown in FIG. 3C.

Additionally, or alternatively, in some embodiments, the AR analysis platform uses a probabilistic model, such as a correlation filter, to determine a location (by coordinates) of a virtual object within an AR scene. A "correlation filter" is a spatial-frequency array designed from a set of training patterns that represent a particularly patterned class, such as a class of object. In some embodiments, the AR analysis platform expresses a correlation filter as a function that generates a probable location of an object within an image (e.g., a screenshot) in terms of coordinates.

Additionally, the AR analysis platform optionally generates a set of images that train a probabilistic model to identify a class of object, such as a chair, when creating a correlation filter. During such training, the set of images includes images of a virtual object (e.g., a chair, shirt, pants) on a monochromatic background in which the virtual object is presented at different orientations (e.g., 60 to 100 digital images in which a virtual chair is rotated 3° to 5° per image). Once the probabilistic model has been trained, the correlation filter controls a shape of a cross-correlation output between a digital image and a filter by minimizing an average Mean Square Error ("MSE") between the cross-correlation output and an ideal desired correlation output for an authentic (or impostor) input digital image. By controlling a shape of the correlation output, correlation filters produce more accurate local estimation of an object's location within an image.

For example, in some embodiments, the AR analysis platform poses a correlation filter design problem as an optimization problem for N training images:

$$\min_{f} \frac{1}{N} \sum_{i=1}^{N} \|x_i \otimes f - g_i\|_2^2 + \lambda \|f\|_2^2 \quad (1)$$

In function (1), $\otimes$ represents the convolution operation, $x_i$ represents the i-th image, f represents the correlation filter template in a particular image's domain, $g_i$ represents the desired correlation output for the i-th image, and $\lambda$ represents the regularization parameter. Because f represents the correlation filter template, it thus represents a spatial-frequency array.

When the AR analysis platform solves the optimization problem shown as equation (1), it produces the following closed-form expression for the correlation filter:

$$\hat{f} = \left[\lambda I + \frac{1}{N}\sum_{i=1}^{N} \hat{X}_i^* \hat{X}_i\right]^{-1} \left[\frac{1}{N}\sum_{i=1}^{N} \hat{X}_i^* \hat{g}_i\right] \quad (2)$$

In function (2), $\hat{x}_i$ represents the Fourier transform of $x_i$, $\hat{X}_i$ represents the diagonal matrix whose diagonal entries are the elements of $\hat{x}_i$, * represents conjugate transpose, and I represents the identity matrix of appropriate dimensions. The development of equations (1) and (2) are further described in Vishnu Naresh Boddeti, Takeo Kanade, and B. V. K. Vijaya Kumar, "Correlation Filters for Object Alignment," Proceedings of the IEEE Conference on Computer Vision and Pattern Recognition (2013), the entire contents of which are hereby incorporated by reference.

Figure 3C:
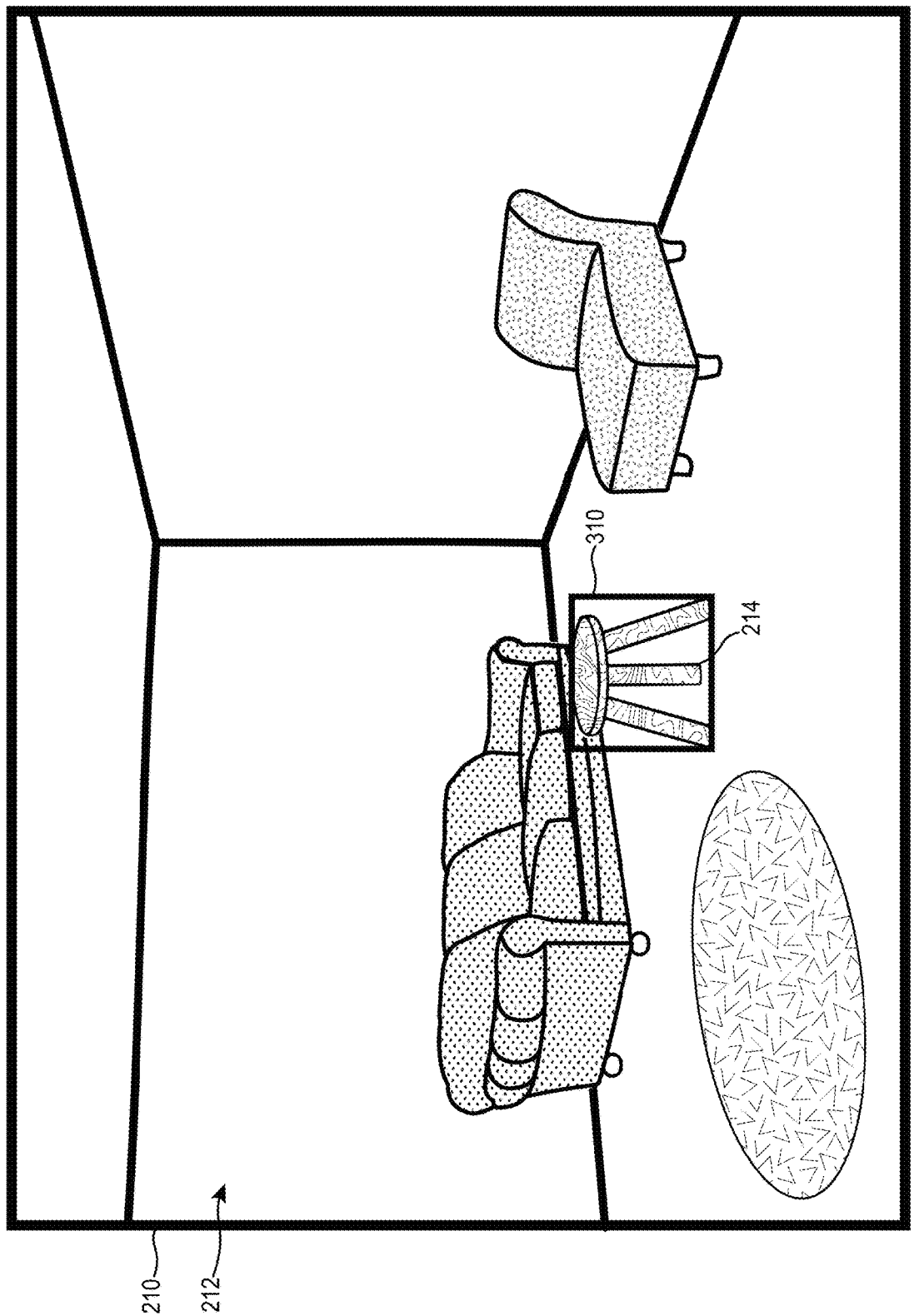

To illustrate the operation of correlation filters and equation (2), in some embodiments, the AR analysis platform applies equation (2) to the screenshot 210 to determine a location of the virtual stool 214 within the screenshot 210. FIG. 3C illustrates the screenshot 210 of the AR scene 212 comprising a bounding box 310 corresponding to the virtual stool 214. As indicated by FIG. 3C, the AR analysis platform inputs the screenshot 210 into a correlation filter, such as equation (2), to produce an object proposal comprising a pair of coordinates. The bounding box 310 in FIG. 3C represent the pair of coordinates produced by equation (2). Similar to a CNN, a function corresponding to a correlation filter—such as equation (2)—does not produce a visual representation of a bounding box, but rather produces a pair of coordinates that (in this case) represent the bounding box 310. In some embodiments, however, the AR analysis platform generates a screenshot or other digital image comprising visual representations of a bounding box, such as the screenshot 210 shown in FIG. 3C.

In some embodiments, AR session metadata captured by the AR client application indicates the orientation of a virtual object, such as binary variables within the AR session data that indicate an orientation of a virtual object. Additionally, in some embodiments, the client device's accelerometer data indicates a tilting motion and orientation of a client device. In some such embodiments, when determining the threshold-instant viewpoint or the longest-constant viewpoint, the AR analysis platform analyzes the AR session metadata to identify a virtual object's orientation and accelerometer data, which (in turn) indications motion of the client device.

After identifying objects or locations of objects within an AR scene, in some embodiments, the AR analysis platform determines a color of various real objects within an AR scene. In particular, the AR analysis platform optionally resizes a shape of a bounding box (which surrounds a real object within a digital image) to a desired shape. Regardless of whether or how the AR analysis platform resizes a bounding box, in some embodiments, the AR analysis platform determines a dominant color of a real object within the bounding box and optionally determines a hue and/or shade of the determined dominant color. In some such embodiments, the AR analysis platform resizes a shape of multiple bounding boxes corresponding to multiple real objects within a digital image and determines dominant colors (or hues and shades of dominant colors) for the multiple real objects.

As just indicated, the AR analysis platform optionally resizes a shape of a bounding box (surrounding a real object within a digital image) to a desired shape. In some such embodiments, the AR analysis platform resizes a bounding box such that the bounding box more tightly conforms to the real object within the digital image. By resizing the bounding box to more tightly conform to the real object, the AR analysis platform eliminates digital space and pixels that it might otherwise analyze when determining a color of the real object. When resizing a bounding box, in some embodiments, the AR analysis platform uses the resizing functions available in Adobe InDesign or Adobe Photoshop.

After (or without) resizing a bounding box, the AR analysis platform optionally determines a dominant color of a real object within the bounding box. In some such embodiments, the AR analysis platform relies on a color model trained to determine dominant colors as perceived by humans described on crowd-sourced data. For example, the AR analysis platform may rely on the Kuler, COLOURLovers, or Amazon Mechanical Turk ("MTurk") color themes and crowd-source ratings (as models) described in Peter O'Donovan, Assem Agarwala, and Aaron Hertmann, "Color Compatibility From Large Datasets," ACM Transactions on Graphics (2011) (hereinafter "O'Donovan"), the entire contents of which are hereby incorporated by reference.

To determine a dominant color of a real object within a bounding box, in some embodiments, the AR analysis platform applies the following objective function to a digital image, such as the digital image 200:

$$\max_t \alpha \cdot r(t) - \frac{1}{N} \sum_i \max(\|c_i - t\|_2, \sigma) - \frac{\tau}{M} \sum_{j \in N(t)} \max(\|c_j - t\|_2, \sigma) \quad (3)$$

In equation (3), $r(t)$ represents the rating of color theme t, $c_i$ represents a pixel color, t represents a color theme, N represents a number of pixels, σ represents a threshold for distance allowed, and α and τ represent learning rate parameters. A norm in equation (3) defines distances. When solving equation (3), the AR analysis platform substitutes numbers in for at least variables M, α, and σ. For example, in at least one embodiment, the AR analysis platform applies equation (3) to a digital image where M=N/20, α=3, and σ=5.

As shown above, equation (3) is an objective function comprising three terms. The first term $$\left(\text{i.e.,} \quad \max_t \alpha \cdot r(t)\right)$$

measures a quality of an extracted color theme. The second term $$\left(\text{i.e.,} \quad \frac{1}{N} \sum_i \max(\|c_i - t\|_2, \sigma)\right)$$

penalizes dissimilarity between each image pixel ci and the most similar color in the color theme t. The third term $$\left(\text{i.e.,} \quad \frac{\tau}{M} \sum_{j \in N(t)} \max(\|c_j - t\|_2, \sigma)\right)$$

penalizes dissimilarity between color theme t and the M most similar image pixels N(t)—to prevent theme colors from drifting from the digital image.

Additionally, equation (3) represents a modified version of an equation in O'Donovan. In contrast to the 5-color theme described in O'Donovan, equation (3) uses a single-color theme that facilitates determining a dominant color. Among other things, equation (3) eliminates the range limitations on variable k used in an equation set forth in O'Donovan.

In some embodiments, the AR analysis platform solves equation (3) using a DIRECT algorithm described by D. R. Jones, C. D. Perttunen, and Bruce E. Stuckman, "Lipschitzian optimization without the Lipschitz constant," Journal of Optimization Theory and Applications 79.1 (1993), pages 157-181, the entire contents of which are hereby incorporated by reference. In such embodiments, the AR analysis platform uses the DIRECT algorithm because this algorithm performs a deterministic global search without requiring certain initialization.

Whether the AR analysis platform uses the DIRECT algorithm or some other algorithm to solve equation (3), the solution produces a hex code representing a determined dominant color. The produced hex code (representing the dominant color) may be any value from a set of 256×256×256 values for the Red, Green, and Blue ("RGB") color model. In other words, the single-color theme for the dominant color output by equation (3) is expressed in hex code.

After determining a dominant color of a real object within a bounding box, in some embodiments, the AR analysis platform determines a hue and a shade of the determined dominant color, where the shade represents a specific "color name." In some such embodiments, the AR analysis platform identifies the hue and shade corresponding to the hex code produced by equation (3), such as a "red" hue and "crimson" shade. In such embodiments, the identified hue and shade will correspond to any one of the 256×256×256 RGB values.

Additionally, or alternatively, in some embodiments, the AR analysis platform uses a hash function that maps a produced hex code (e.g., produced by equation (3)) to a color name of a hex code nearest to the produced hex code. Using such a hash function reduces the number of color possibilities for which the AR analysis platform later determines compatibility. In such embodiments, prior to using a hash function, the AR analysis platform uses the following distance metric to approximate the RGB code for the produced hex code:

$$\text{distance} = |R_i - r| + |G_i - g| + |B_i - b| \quad (4)$$

In function (4), $<R_i, G_i, B_i>$ respectively represent one of an RGB triplet within a hex code of equation (4), and $<r, g, b>$ respectively represent one of an RGB triplet corresponding to the hex code for the determined dominant color (e.g., the hex code produced by equation (3)). Accordingly, equation (4) produces a hex code that approximates the hex code corresponding to the determined dominant color.

To translate the approximate hex code produced by equation (4) into a hue and/or shade, the AR analysis platform uses two different hash functions, $H_1$ and $H_2$. The $H_1$ hash function maps the approximate hex code produced by equation (4) to a shade for the determined dominant color. The $H_2$ hash function maps the approximate hex code produced by equation (4) to a hue for the determined dominant color. Depending on the embodiment, the AR analysis platform uses either the hue and/or shade of the dominant color as a basis (in further analyses) for creating a product recommendation.

Figure 4:
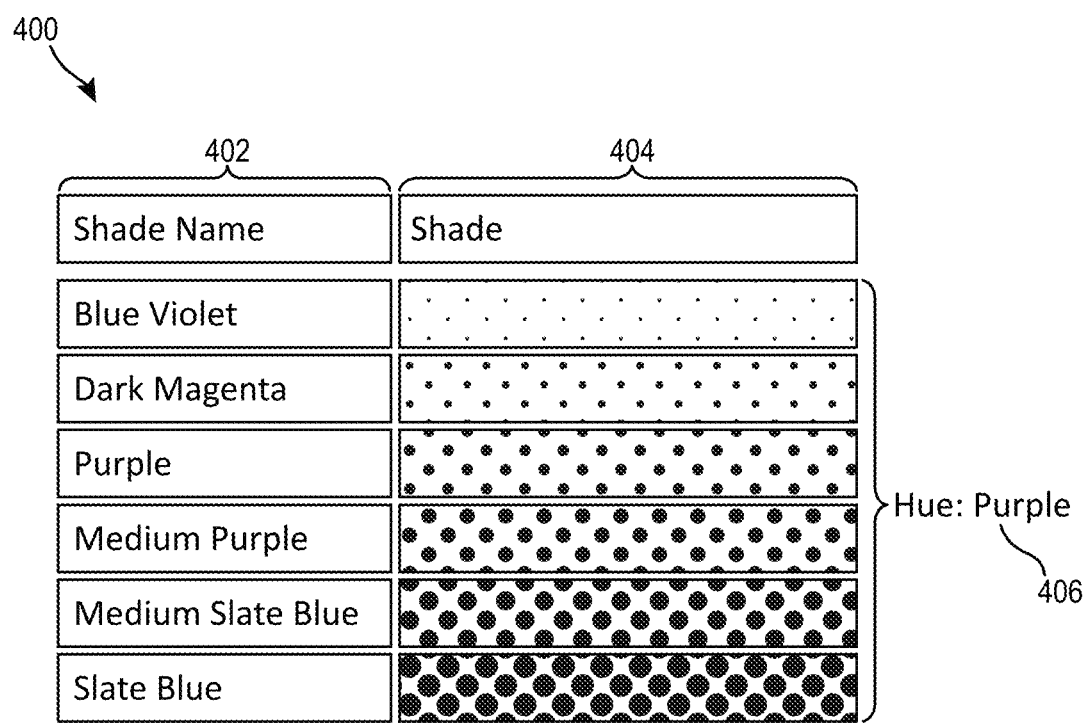
FIG. 4 illustrates a hue-and-shade gradient in accordance with one or more embodiments.

FIG. 4 illustrates a hue-and-shade gradient 400 that demonstrates the relationship between hue and shade. Hash functions $H_1$ and $H_2$ identify a shade or hue, respectively, similar to the shades and hue identified in FIG. 4. The hue-and-shade gradient 400 includes a shade-name column 402, a shade column 404, and a hue identifier 406. The hue identifier 406 identifies a hue that corresponds to each shade shown in the shade column 404.

For illustrative purposes only, the hue identifier 406 identifies "purple" as the hue that corresponds to each shade shown in the shade column 404. Other hues, however, could be used to demonstrate the hue-shade relationship (e.g., hue of red, green, or blue). The shade column 404 includes different shades of the identified hue. Specifically, the polka-dot pattern covering each row within the shade column 404 indicates a different shade of the identified hue (i.e., different shades of purple). Moreover, each row within the shade-name column 402 includes a shade name corresponding to a different shade depicted in the row of the shade column 404 directly next to the shade name.

In addition to determining a color of real objects within an AR scene, in some embodiments, the AR analysis platform determines a relative position of a virtual object with respect to a real object within an AR scene. By determining a relative position of a virtual object, the AR analysis platform determines visual characteristics with which the AR analysis platform may determine whether potential endorsed products are compatible with real objects and provide product recommendations. When determining a virtual object's relative position in an AR scene, the AR analysis platform compares a position of a bounding box (corresponding to a real object) to a position of a bounding box (corresponding to a virtual object) as shown within a digital image. For illustrative purposes, this disclosure refers to a position of a bounding box or other object within a two-dimensional digital image as a "surface position." The surface position of an object differs from (but may correspond to) a position of the same object within a three-dimensional AR scene.

For example, in some embodiments, the AR analysis platform compares a surface position of the bounding box 304 within the digital image 200 (as shown in FIG. 3B) with a surface position of the bounding box 310 within the screenshot 210 (as shown in FIG. 3C). Because the digital image 200 in FIG. 3B and the screenshot 210 in FIG. 3C capture the same viewpoint—by comparing the surface positions of bounding boxes 304 and 310—the AR analysis platform may likewise determine a relative position of the virtual stool 214 with respect to the sofa 204 in the three-dimensional AR scene 212.

Upon determining surface positions of bounding boxes, the AR analysis platform translates the relative surface positions of bounding boxes within a two-dimensional digital image to relative positions of objects in three-dimensional space. For example, assuming that the top edge of the screenshot 210 represents an x-axis, the left edge of the screenshot 210 represents a y-axis, and both x and y values are positive, the relative surface position of bounding-box coordinates in a two-dimensional grid (with an x-axis and a y-axis) suggest a relative position of objects corresponding to the bounding boxes in three-dimensional space.

To illustrate, when y-axis-coordinates for a center of the bounding box 310 are greater than y-axis-coordinates for a top-left corner of the bounding box 304, the AR analysis platform determines that the virtual stool 214 is in front of the sofa 204 in three-dimensional space (as shown in the AR scene 212 of FIG. 3C). Where the top edge of the screenshot 210 represents an x-axis, the left edge of the screenshot 210 represents a y-axis, and both x and y values are positive—the value of y increases in a downward direction of the screenshot 210, and the value of x increases in a rightward direction of the screenshot 210.

Figure 5A:
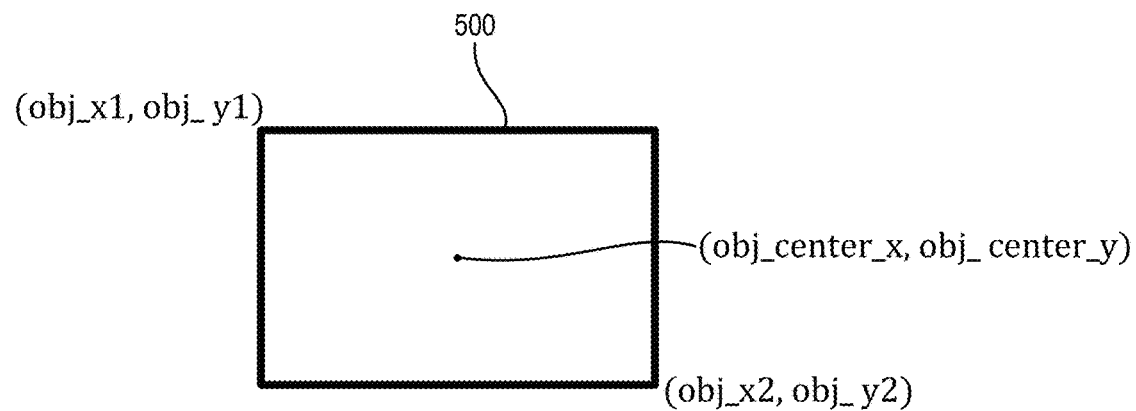
FIG. 5A illustrates bounding boxes in accordance with one or more embodiments.
Figure 5A:
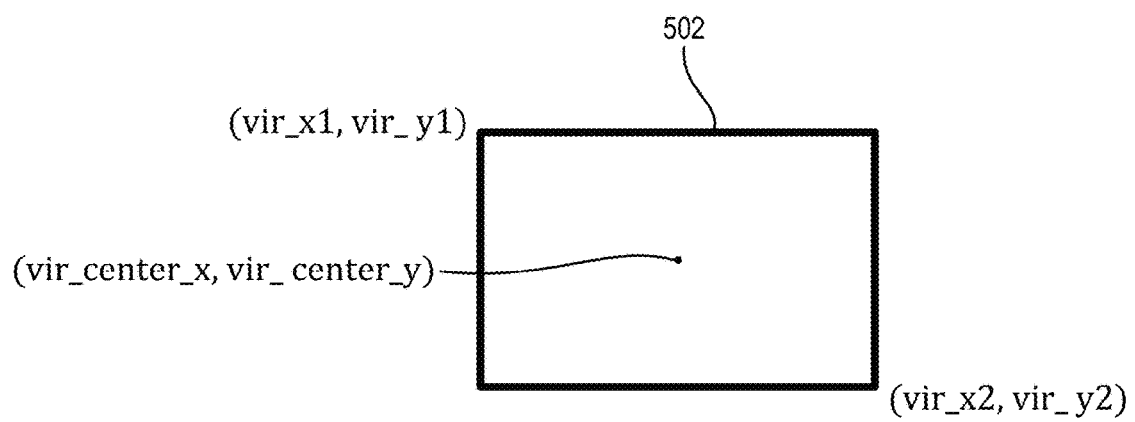

To make surface position comparisons, in some embodiments, the AR analysis platform identifies coordinate pairs for corners and a center of each bounding box within a digital image. FIG. 5A illustrates example coordinate pairs that the AR analysis platform identifies for a real object's bounding box (referred to as "RB") and a virtual object's bounding box (referred to as "VB"). As illustrated by FIG. 5A, a real object's bounding box 500 (or RB 500) and a virtual object's bounding box 502 (or VB 502) each respectively include coordinate pairs corresponding to two corners and a center of RB 500 and VB 502.

As shown in FIG. 5A, RB 500 includes coordinate pairs (obj_x_x1, obj_y1), (obj_center_x, obj_center_y), and (obj_x2, obj_y2). Coordinate pair (obj_x_x1, obj_y1) identifies a top-left corner of RB 500; coordinate pair (obj_center_x, obj_center_y) identifies a center of RB 500; and coordinate pair (obj_x2, obj_y2) identifies a bottom-right corner of RB 500. Similarly, VB 502 includes coordinate pairs (vir_x1, vir_y1), (vir_center_x, vir_center_y), and (vir_x2, vir_y2). Coordinate pair (vir_x1, vir_y1) identifies a top-left corner of VB 502; coordinate pair (vir_center_x, vir_center_y) identifies a center of VB 502; and coordinate pair (vir_x2, vir_y2) identifies a bottom-right corner of VB 502.

In some embodiments, and as shown in a position-correlation table 503 of FIG. 5B, the AR analysis platform uses position correlations that identify a relative position of a virtual object with respect to a real object (in three-dimensional space) based on the relative surface positions of bounding boxes (in two-dimensional space). As in the example above, for the position correlations, the value of y increases in a downward direction for the position correlations, and the value of x increases in a rightward direction. Additionally, the position correlations use one coordinate from a bounding-box coordinate pair to make comparisons, such as obj_x1 of the coordinate pair (obj_x_x1, obj_y1).

According to position correlations 504 shown in FIG. 5B, the virtual object corresponding to VB 502 is in front of the real object corresponding to RB 500 in three-dimensional space when (a) VB 502 lies completely below RB 500 without any overlap; (b) VB 502 lies within the two vertical edges of RB 500 such that vir_center_y>obj_y1; (c) VB 502 overlaps with RB 500, and vir_center_y>obj_y2; and (d) VB 502 overlaps with RB 500, the center of VB 502 lies in between the horizontal edges of RB 500, and obj_x1<vir_center_x<obj_x2.

According to position correlations 506, the virtual object corresponding to VB 502 is in back of the real object corresponding to RB 500 in three-dimensional space when (a) VB 502 lies completely above RB 500 without any overlap; (b) VB 502 lies within the two vertical edges of RB 500 such that vir_center_y<obj_y1; and (c) VB 502 overlaps with RB 500, and vir_center_y<obj_y2.

According to position correlations 508, the virtual object corresponding to VB 502 is to the left of the real object corresponding to RB 500 in three-dimensional space when (a) VB 502 lies completely to the left of RB 500 such that vir_y2<obj_y2 and vir_y1>obj_y1 (no overlap); (b) VB 502 lies completely to the left of RB 500 such that vir_y2>obj_y2 and vir_y1<obj_y1 (no overlap); and (c) VB 502 overlaps with RB 500, the center of VB 502 lies in between the horizontal edges of RB 500, and vir_center_x<obj_x1.

According to position correlations 510, the virtual object corresponding to VB 502 is to the right of the real object corresponding to RB 500 in three-dimensional space when (a) VB 502 lies completely to the right of RB 500 such that vir_y2<obj_y2 and vir_y1>obj_y1 (no overlap); (b) VB 502 lies completely to the right of RB 500 such that vir_y2>obj_y2 and vir_y1<obj_y1 (no overlap); and (c) VB 502 overlaps with RB 500, the center of VB 502 lies in between the horizontal edges of RB 500, and vir_center_x>obj_x2.

In addition to the position correlations 504-510 shown in FIG. 5B, in some embodiments, the AR analysis platform uses various alternate words (or, in some cases, synonyms) for the relative positions of "front," "back," "left," and "right" to mark relative positions in three-dimensional space. For example, instead of describing the virtual object corresponding to VB 502 as in "front" of the real object corresponding to RB 500 in three-dimensional space, the AR analysis platform may describe the virtual object corresponding to VB 502 as "anterior" to the real object corresponding to RB 500 in three-dimensional space.

Figure 5C:
FIG. 5C illustrates a position-alternates table in accordance with one or more embodiments.

FIG. 5C illustrates a position-alternates table 512 that sets forth various alternate words for the relative positions of "front," "back," "left," and "right." As shown in FIG. 5C, a relative-position column 514 includes the relative positions "front," "back," "left," and "right" used in the position correlations 504-510 of FIG. 5B. Conversely, an alternate-words column 516 of FIG. 5C includes various words that are either alternatives for (or, some cases, synonyms of) the relative positions. The word in each row of the relative-position column 514 corresponds to the words directly to the right—in a corresponding row of the alternate-words column 516 (e.g., the relative position "front" corresponds to the alternate words "front, after, anterior"). In some embodiments, the AR analysis platform uses the words in the alternate-words column 516 instead of the words in the relative-position column 514 for position correlations or for other purposes described below.

In addition to determining a relative position of a virtual object within an AR scene, in some embodiments, the AR analysis platform creates real-object tuples that correspond to real objects. As described further below, the real-object tuples facilitate selecting potential endorsed products to use with real objects in a product recommendation. Specifically, the real-object tuples comprise visual characteristics of a real object (or of a related virtual object) that the AR analysis platform uses to distinguish between potential endorsed products.

For example, in some embodiments, a real-object tuple comprises one or more of a real-object type that identifies a type of a real object, a real-object color that identifies a color of the real object, and a virtual object's relative position with respect to the real object. A real-object tuple of <chair, blue, right>, for example, would comprise the three components just described in a single real-object tuple. In some embodiments, the real-object type (of a real-object tuple) corresponds to an object label produced by a CNN; the real-object color (of a real-object tuple) corresponds to a dominant color produced by equation (3) or equation (4) and/or mapped by hash functions $H_1$ and $H_2$; and the virtual object's relative position (of a real-object tuple) corresponds to a surface position identified by AR session data or by a correlation filter and then translated into a relative position by a position correlation, as described above.

Additionally, in some embodiments, the AR analysis platform creates multiple real-object tuples that specify a hue or a shade of the real object's dominant color. By specifying a hue or shade of a dominant color, the AR analysis platform determines more granular visual characteristics that aid in selecting a compatible endorsed product. Additionally, in some embodiments, the AR analysis platform creates multiple real-object tuples that vary words to describe the virtual object's relative position with respect to the real object, such as the alternate words set forth in the position-alternates table 512 of FIG. 5C.

FIG. 6 illustrates a real-object-tuple table 600 that includes examples of real-object tuples. As shown, each real-object tuple includes a real-object type, a real-object color (by hue or shade), and a virtual object's relative position (e.g., <sofa, purple, front>). Additionally, the real-object tuples shown in FIG. 6 vary both by a real object's hue or shade and by words to describe a virtual object's relative position. For example, a column 602 includes real-object tuples that specify a real-object hue that identifies a hue of the real object (e.g., real-object tuple <sofa, purple, front> specifies a purple hue). Conversely, a column 604 includes real-object tuples that specify a real-object shade that identifies a shade of the real object (e.g., real-object tuple <sofa, Medium Orchid, front> specifies a Medium Orchid shade of purple). Moreover, each of rows 606, 608, and 610 include real-object tuples that specify a different word to describe the virtual object's relative position with respect to the real object (e.g., row 608 includes a tuple of <sofa, purple, after> and row 610 includes a tuple of <sofa, purple, anterior> where "after" and "anterior" both describe the virtual object's relative position).

While FIG. 6 illustrates real-object tuples corresponding to a particular real object (i.e., a sofa), in some embodiments, the AR analysis platform creates real-object tuples that correspond to multiple real objects within a digital image. For example, the AR analysis platform may create a plurality of real-object tuples corresponding to each identified real object within the digital image 200, including the sofa 204, the rug 206, and the chair 208. As suggested by FIG. 6, in some embodiments, the AR analysis platform also creates a plurality of real-object tuples corresponding to multiple real objects, where the real-object tuples vary both by a real object's hue or shade and by words to describe a virtual object's relative position. For example, the AR analysis platform may create a plurality of real-object tuples for each of the sofa 204, the rug 206, and the chair 208—where the real-object tuples include the same kind of variability shown in the real-object-tuple table 600.

In addition to creating real-object tuples, in some embodiments, the AR analysis platform determines whether a color of a real object from the AR scene is compatible with a color of a potential endorsed product. The AR analysis platform may determine, for example, whether a dominant color determined for a real shirt is compatible with a color of pants advertised or sold by a digital publisher. By determining whether colors of real objects and endorsed products are compatible, the AR analysis platform generates visual characteristic comparisons that facilitate selecting an endorsed product to include in a product recommendation.

In some embodiments, the AR analysis platform systematically determines whether each color of multiple real objects (from an AR scene) is compatible with each color of multiple endorsed products. For example, the AR analysis platform optionally generates a color-compatibility score for each of multiple object-color combinations that account for the colors of multiple real objects and multiple endorsed products. In such embodiments, the term "color-compatibility score" refers to a measure of compatibility between two or more colors. Moreover, the term "object-color combination" refers to a combination of a color of a real object (within an AR scene) and a color of an endorsed product. Multiple object-color combinations may include, for example, all possible two-color combinations, each of which comprise one of any color of multiple real objects (as a first color) and one of any color of multiple endorsed products comprising (as a second color).

When generating color-compatibility scores, in some embodiments, the AR analysis platform applies a Lasso Regression model that uses a color palette, such as a four-, five-, or six-color palette. For example, the AR analysis platform optionally creates multiple five-color palettes that each include a dominant color of a real object, a color of an endorsed product, and white for the three remaining colors. As a person having ordinary skill in the art will recognize, the selection of white for the three remaining colors facilitates comparison and evaluation of the other two colors. In such embodiments, the AR analysis platform inputs all possible arrangements of the five-color palette into a Lasso Regression model, as described in O'Donovan, and the Lasso algorithm produces a color-compatibility score between 1 and 5 for each palette arrangement. In some embodiments, the AR analysis platform normalizes the color-compatibility scores to lie within 0 and 1.

Figure 7:
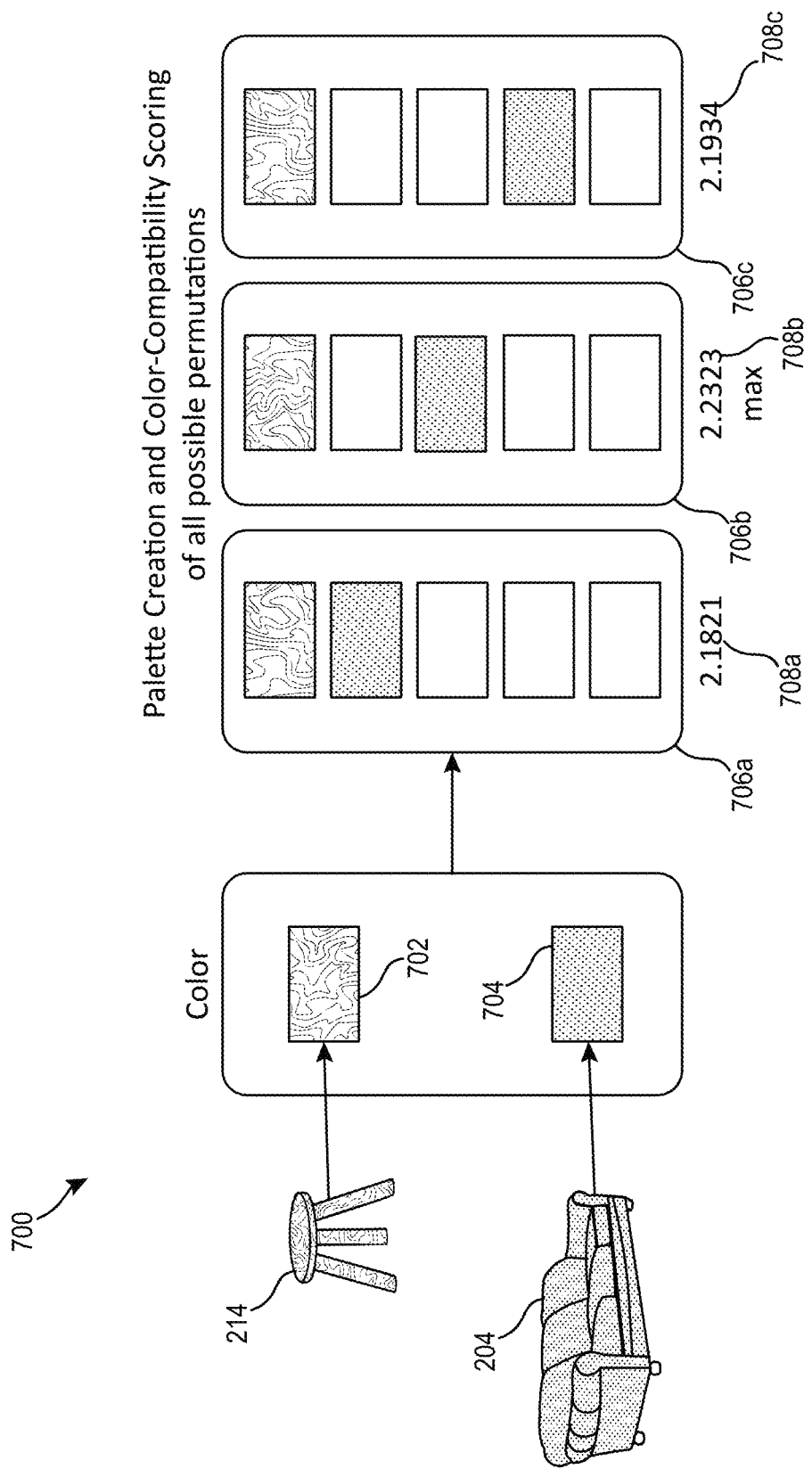
FIG. 7 illustrates a schematic drawing of generating color-compatibility scores in accordance with one or more embodiments.

FIG. 7 illustrates a schematic drawing 700 of the AR analysis platform generating color-compatibility scores for different five-color palettes corresponding to a single object-color combination. As shown in FIG. 7, the AR analysis platform selects an object-color combination comprising a color 702 of an endorsed product and a color 704 of a real object. The color 702 corresponds to a color identified for the virtual stool 214 by a metatag in AR session data. In this particular embodiment, the virtual stool 214 represents an endorsed product. The color 704 corresponds to a dominant color determined for the sofa 204 (e.g., a hex code for a dominant color or an approximate hex code produced by equation (4)). While FIG. 7 illustrates a single object-color combination of color 702 and color 704, the AR analysis platform also generates color-compatibility scores for multiple object-color combinations, such as object-color combinations comprising one color of many colors corresponding to several endorsed products, on the one hand, and one dominant color of three dominant colors determined for each of the sofa 204, the rug 206, and the chair 208.

To illustrate, the AR analysis platform generates different five-color palettes for the object-color combination of the colors 702 and 704, including a palette 706a, a palette 706b, and a palette 706c. Palettes 706a, 706b, and 706c each comprise a different arrangement of five colors, including the color 702, the color 704, and white for the remaining three colors. While FIG. 7 illustrates three five-color palettes as examples, the AR analysis platform generates five-color palettes that include all possible arrangements (or orders) of the color 702, the color 704, and the remaining three white colors (i.e., 20 different arrangements that put the five colors in different orders). Similarly, in embodiments that generate color-compatibility scores for multiple object-color combinations, the AR analysis platform generates five-color palettes comprising all possible arrangements, where the five colors comprise each different color from each of several endorsed products, each dominant color determined for each of several real objects, and a remaining three white colors.

As further shown in FIG. 7, the AR analysis platform generates a color-compatibility score for each of the palettes 706a, 706b, and 706c, including color-compatibility scores 708a, 708b, and 708c, respectively. Although not shown, the AR analysis platform likewise generates a color-compatibility score for each of the other, different five-color-palette arrangements for the object-color combination of the colors 702 and 704.

In at least one embodiment, the AR analysis platform uses a maximum color-compatibility score (from among all the color-compatibility scores generated for all five-color palettes) as a representative color-compatibility score for a single object-color combination. In the embodiment shown in FIG. 7, the color-compatibility score 708b would be the representative color-compatibility score. In additional embodiments, the AR analysis platform uses an average, mean, reverse average, or reverse mean (from among all the color-compatibility scores generated for all five-color palettes) as a representative color-compatibility score for a single object-color combination. In such embodiments, and as indicated below, the AR analysis platform uses the representative color-compatibility score as a scoring factor in selecting an endorsed product.

In addition to determining the compatibility of a real object's color and an endorsed product's color, the AR analysis platform optionally generates scores that facilitate distinguishing among real-object tuples as they relate to various endorsed products. As noted above, some real-object tuples include a virtual object's relative position with respect to a real object. As described further below, in some embodiments, the AR analysis platform creates a product recommendation that describes a position of an endorsed product that corresponds to a virtual object's relative position. To facilitate selecting a relative position for certain product recommendations, in some embodiments, the AR analysis platform generates tuple-combination scores.

As used herein, the term "tuple combination" refers to a combination of a real-object tuple and an endorsed product. For example, a tuple combination may include a real-object tuple of "<sofa, purple, front>" and an endorsed product of a forest-green chair. In one or more embodiments, the AR analysis platform generates a tuple-combination score for each of multiple tuple combinations. Regardless of how many tuple-combination scores are generated, in some embodiments, the AR analysis platform generates tuple-combination scores based on one or more scoring factors. The scoring factors include, but are not limited to, an object-label-confidence score, a color-compatibility score, an association value, a position weight, and a color-detail weight. This disclosure describes each of the example scoring factors below.

As described above, an object-label-confidence score represents a measure of confidence in an object label determined for a particular object. In some embodiments, the AR analysis platform inputs a digital image (e.g., the digital image 200) into a CNN (e.g., the RPN and/or R-CNN) that, among other things, generates an object-label-confidence score for the CNN's object label. The CNN's object label corresponds to a real object depicted in a digital image (e.g., the sofa 204 in the digital image 200). In some embodiments, the AR analysis platform uses the object-label-confidence score as a scoring factor when generating a tuple-combination score. In doing so, the AR analysis platform increases the probability that a product recommendation recommends an endorsed product for use with a real object that exists.

In addition (or in the alternative) to using an object-label-confidence sore as a scoring factor, the AR analysis platform also uses a color-compatibility score as a scoring factor. As described above, a color-compatibility score represents a measure of compatibility between two or more colors. In some embodiments, the AR analysis platform generates a color-compatibility score for various object-color combinations—consistent with the disclosure above—and uses the representative color-compatibility score as a scoring factor when generating a tuple-combination score.

In addition (or in the alternative) to the scoring factors described above, in some embodiments, the AR analysis platform generates an association value that corresponds to an association between a real object and an endorsed product. As used herein, the term "association value" refers to a measure of an association between two or more objects, such as an association between a real object and an endorsed product. For example, in some embodiments, the association value refers to a measure of strength of association between a real object from a real-object-tuple and an endorsed product—such as an association between the sofa 204 and the virtual stool 214.

When generating an association value, the AR analysis platform uses an association-rule-learning model that identifies rules from a database using a measure of interestingness. For example, an association-rule-learning model may infer from a database of point-of-sale data that a consumer who purchases a sofa is more likely to purchase a table than a picture or that a consumer who purchases a shirt is more likely to purchase pants than a fishing pole. While this example uses a database of point-of-sale data, an association-rule-learning model may use any database to infer probabilities of association between objects including both positive and negative probabilities.

Based on the detected probabilities, the association-rule-learning model develops association rules and association values (the latter of which correspond to the association rules). In some cases, for example, the association-rule-learning model relies on algorithms, such as the Apriori, Eclat, and FP-Growth algorithms, to develop the association rules and association values. Some such association-rule-learning models and algorithms are disclosed by Tianyi Wu, Yuguo Chen, and Jiawei Han, "Association Mining in Large Databases: A Re-Examination of Its Measures," Knowledge Discovery in Database: PKDD—11th European Conference on Principles and Practice of Knowledge Discovery in Databases, Proceedings, pages 621-628 (2007), the entire contents of which are hereby incorporated by reference.

In some embodiments, the AR analysis platform generates an association value (or refers to a database or server that includes association values) and uses the association value as a scoring factor when generating a tuple-combination score. For example, in some cases, the AR analysis platform discretizes association values to a set of 0.5 and 1.0 values and uses the discretized association values as scoring factors. In other embodiments, however, the AR analysis platform uses alternative or additional value sets, such as any number between 0.0 and 1.0 or any other range of numbers, fractions, or percentages, when using association values as scoring factors.

In addition (or in the alternative) to generating or referring to association values as scoring values, in some embodiments, the AR analysis platform generates a position weight that corresponds to a relative position of an endorsed product with respect to a real object. The term "position weight" refers to a weight that the AR analysis platform assigns to an endorsed product's relative position (e.g., "front," "back," "left," "right") with respect to a real object. Alternatively, the term "position weight" refers to a weight that the AR analysis platform assigns to an alternate word describing the endorsed product's relative position (e.g., the alternate word of "anterior" for the relative position of "front" or the alternate word of "next" for the relative position of "right"). As indicated above, FIG. 5C includes a position-alternates table 512 that lists examples of such alternate words.

For example, in some embodiments, the AR analysis platform assigns a higher position weight to a relative position (e.g., "front") than to a corresponding alternate word (e.g., "anterior"). To illustrate such an example, the AR analysis platform may assign a position weight of 0.7 to the relative position of "front" and a position weight of 0.3 to all corresponding alternate words, including to "anterior" and "after." Because the relative positions listed in the relative-position column 514 are generally more precise than the words listed in the alternate-words column 516, assigning a higher position weight to a relative position than to an alternate word places more weight on a more precise relative position. Conversely, in some embodiments, the AR analysis platform assigns a lower position weight to a relative position (e.g., "front") than to a corresponding alternate word (e.g., "anterior") or assigns equal position weights to a relative position and a corresponding alternate word.

In some embodiments, the relative position of the endorsed product (with respect to the real object) corresponds to a virtual object's relative position (with respect to a real object) from a real-object tuple. In other words, the real object that serves as a point-of-reference for a relative position comes from a real-object tuple. For example, the AR analysis platform may generate a position weight that corresponds to a relative position of an endorsed product with respect to a real object—as indicated by the real-object tuple of "<sofa, purple, front>." In such an embodiment, the AR analysis platform uses the virtual object's relative position (i.e., "front") as the endorsed product's relative position for purposes of generating a position weight.

In addition (or in the alternative) to generating a position weight, in some embodiments, AR analysis platform generates a color-detail weight that corresponds to a real object's color. As indicated by FIG. 4 and the accompanying description, each dominant color determined for a real object has a hue and/or a shade. The term "color-detail weight" refers to a weight that the AR analysis platform assigns to a shade or a hue determined for a real object, as designated in a real-object tuple. As described above, in some embodiments, a real-object tuple includes a determined color by hue or shade for a real object (e.g., a hue of "purple" in the real-object tuple of "<sofa, purple, front>" or a shade of "Medium Orchid" in the real-object tuple of "<sofa, Medium Orchid, front>").

In some embodiments, the AR analysis platform assigns a higher color-detail weight to a shade than to a hue. To illustrate such an example, the AR analysis platform may assign a color-detail weight of 0.7 to the shade of "Dark Magenta" and a color-detail weight of 0.3 to a corresponding hue of "Purple." As shown in FIG. 4, "Dark Magenta" is a shade of the hue "Purple." Indeed, in some embodiments, the AR analysis platform may assign a same color-detail weight (e.g., 0.7) to all shades of a color (e.g., "Blue Violet," "Dark Magenta," "Purple" or "True Purple," "Medium Purple," "Medium Slate Blue," "Slate Blue") and a different but lower color-detail weight to a corresponding hue (e.g., "Purple"). Because shades are more precise than hues, assigning a higher color-detail weight to a shade than to a hue places more weight on a more precise color. Conversely, in some embodiments, the AR analysis platform assigns a lower color-detail weight to shades than to hues or assigns equal color-detail weights to shades and hues of the same color.

Based on one or more of the scoring factors described above, in some embodiments, the AR analysis platform generates a tuple-combination score for one or more tuple combinations. For example, in some embodiments, the AR analysis platform generates a tuple-combination score for a particular tuple combination by multiplying each scoring factor corresponding to the particular tuple combination. The following equation provides an example of generating such a tuple-combination score:

$$\text{Tuple Combination Score} = LC*CC*AV*PW*CD \quad (5)$$

In equation (5), LC represents an object-label-confidence score, CC represents a color-compatibility score, AV represents an association value, PW represents a position weight, and CD represents a color-detail weight.

In embodiments that use equation (5), the AR analysis platform generates a tuple-combination score for a particular tuple combination. For example, the AR analysis platform may generate a tuple-combination score for the tuple combination of "<sofa, purple, front>" as the real-object tuple and a "Purple Chair" as the endorsed product. For this particular tuple combination, the AR analysis platform may have generated an LC of 0.893, a CC of 0.3085, an AV of 1.0, a PW of 0.7, and a CD of 0.3. Using equation (5), the AR analysis platform generates a tuple-combination score of 0.058 for the tuple combination of "<sofa, purple, front>" as the real-object tuple and a "Purple Chair" as the endorsed product (i.e., Tuple Combination Score=0.893×0.3085×1× 07×0.3=0.058).

Figure 8:
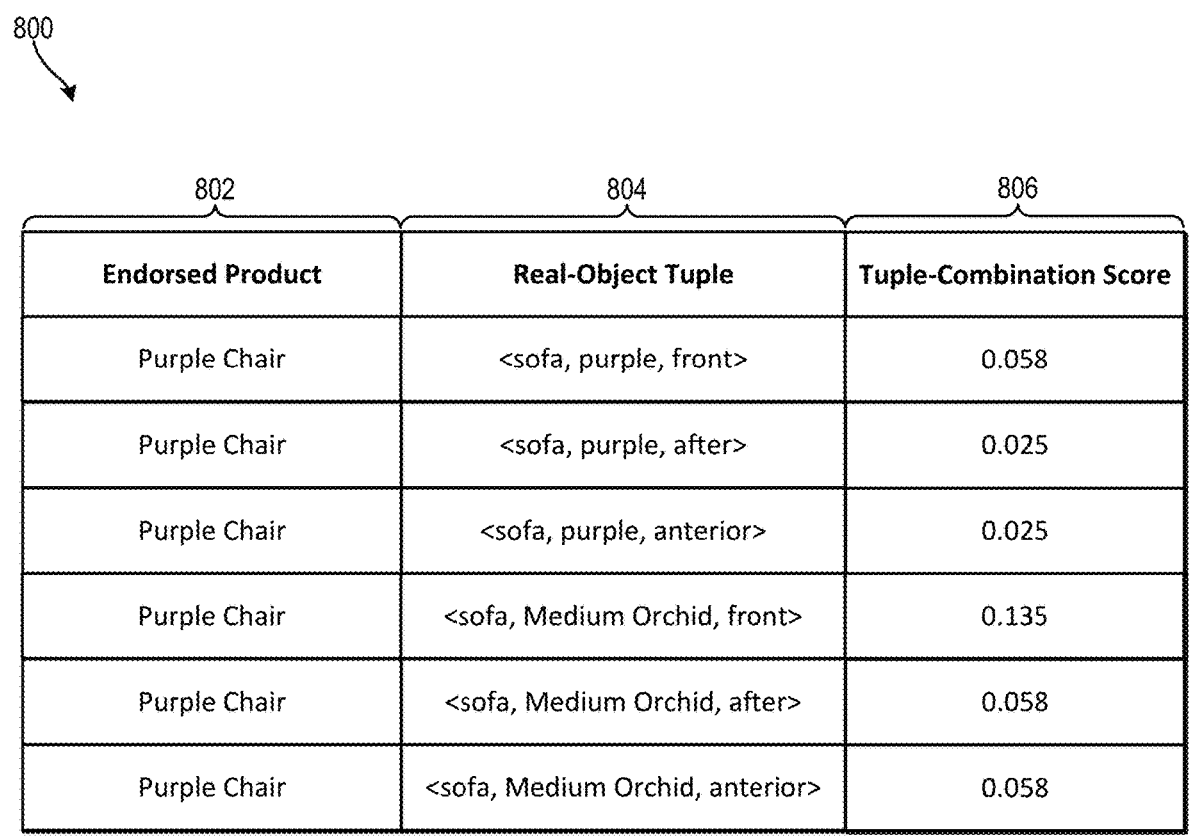
FIG. 8 illustrates a tuple-combination-score table in accordance with one or more embodiments.

FIG. 8 illustrates a tuple-combination-score table 800 that includes several tuple combinations and corresponding tuple-combination scores. As shown, an endorsed-product column 802 includes an endorsed product corresponding to different tuple combinations. Although endorsed-product column 802 includes a single endorsed product (i.e., "Purple Chair"), as noted above, the AR analysis platform optionally generates tuple-combination scores for tuple combinations with varying endorsed products. The real-object-tuple column 804 includes several real-object tuples corresponding to different tuple combinations. Each row of the tuple-combination-score table 800 includes a different tuple combination (e.g., "Purple Chair" and "<sofa, purple, front>" representing one tuple combination and "Purple Chair" and "<sofa, purple, after>" representing another tuple combination). As shown in a tuple-combination-score column 806, the AR analysis platform generates a tuple-combination score for each of the tuple combinations in tuple-combination-score table 800 using equation (5).

As shown in FIG. 8 and as suggested above, in some embodiments, the real object used for the object-label-confidence score, color-compatibility score, association value, position weight, and color-detail weight corresponds to a real object of a particular real-object tuple. In such embodiments, the AR analysis platform generates a tuple-combination score for a tuple combination comprising the particular real-object tuple, on the one hand, and an endorsed product or one of multiple endorsed products, on the other hand. Indeed, in embodiments where the tuple combination comprises one of multiple endorsed products, each endorsed product corresponds to a set of real-object tuples and tuple-combination scores.

Additionally, in some embodiments, the AR analysis platform generates a tuple-combination score for tuple combinations based on only some of the scoring factors representing by equation (5). For example, in an embodiment in which a real-object tuple comprises a real-object type and a real-object color only (e.g., "<sofa, purple>"), the AR analysis platform may generate a tuple-combination score for one or more tuple combinations based on the object-label-confidence score, color-compatibility score, association value, and color-detail weight corresponding to the tuple combination, but not based on a corresponding position weight. Additionally, in an embodiment in which a real-object tuple comprises a real-object type and a virtual object's relative position only (e.g., "<sofa, front>"), the AR analysis platform may generate a tuple-combination score for one or more tuple combinations based on the object-label-confidence score, association value, and position weight corresponding to the tuple combination, but not based on a corresponding color-compatibility score or color-detail weight.

In addition (or in the alternative) to generating tuple-combination scores, in some embodiments, the AR analysis platform selects one or more endorsed products to recommend for use with a real object. In some embodiments, the AR analysis platform selects an endorsed product based on the tuple-combination scores. For example, the AR analysis platform may select an endorsed product corresponding to a tuple combination having a highest tuple-combination score—from all tuple-combination scores generated based on visual information corresponding to the same AR scene.

Additionally, the AR analysis platform may select two endorsed products to recommend for use with a real object. In some such embodiments, the AR analysis platform may select a first endorsed product corresponding to a tuple combination having a highest tuple-combination score—from among all tuple-combination scores based on visual information concerning the same AR scene. Moreover, the AR analysis platform may select a second endorsed product corresponding to a tuple combination having a second highest tuple-combination score—from among all remaining tuple-combination scores corresponding to tuple combinations comprising a different endorsed product and based on visual information concerning the same AR scene.

The AR analysis platform optionally produces multiple product recommendations that recommend different endorsed products. To facilitate recommending different endorsed products, the AR analysis platform selects a diverse set of tuple combinations based on the tuple-combination scores. The term "diverse set of tuple combinations" refers to two or more tuple combinations that comprise different endorsed products and/or different real-object tuples. Rather than select a number of tuple combinations corresponding to the highest tuple-combination scores—which may result in selecting the same endorsed product—the AR analysis platform creates an object graph that facilitates selection of a diverse set of tuple combinations.

For example, the AR analysis platform creates an object graph comprising tuple nodes connected by edges. In such an object graph, each tuple node $v_i$ represents a real-object tuple. The AR analysis platform assigns each tuple node $v_i$ a tuple-combination score $r_i$. Specifically, the AR analysis platform assigns the tuple-combination score $r_i$ that the AR analysis platform generated for the tuple combination represented by the tuple node $v_i$. In some cases, the object graph comprises an equal number of tuple nodes corresponding to each endorsed product. Because the edges $e_{ij}$ that connect the tuple nodes $v_i$ are bidirectional, the object graph is an undirected graph.

The AR analysis platform likewise can assign a weight $w_{ij}$ to each edge $e_{ij}$, where the weight $w_{ij}$ assigned to each edge $e_{ij}$ represents a similarity between a pair of tuple nodes, $v_i$ and $v_j$. In some such embodiments, the weight $w_{ij}$ is an element of a set of numbers that are greater than or equal to 0 and less than or equal to 1, such that $w_{ij} \in [0, 1]$.

Additionally, where real-object tuples comprise a real-object type, a real-object color, and a virtual object's relative position as elements, the AR analysis platform defines "similarity" as follows:

If all elements of two real-object tuples (represented by two tuple nodes $v_i$ and $v_j$) are the same, then the weight $w_{ij}$ assigned to the edge $e_{ij}$ equals 1 (i.e., $w_{ij}=1$).

If the real-object types of two real-object tuples (represented by two tuple nodes $v_i$ and $v_j$) are different, then the weight $w_{ij}$ assigned to the edge $e_{ij}$ equals 0 (i.e., $w_{ij}=0$).

If the real-object types and the real-object colors are the same, but the virtual object's relative positions are different—as between two real-object tuples (represented by two tuple nodes $v_i$ and $v_j$)—then the weight $w_{ij}$ assigned to the edge $e_{ij}$ equals 0.7 (i.e., $w_{11}=0.7$).

If the real-object types and the virtual object's relative positions are the same, but the real-object colors are different—as between two real-object tuples (represented by two tuple nodes $v_i$ and $v_j$)—then the weight $w_{ij}$ assigned to the edge $e_{ij}$ equals 0.2 (i.e., $w_{ij}=0.2$).

If the real-object types are the same, but the real-object colors and the virtual object's relative positions are different—as between two real-object tuples (represented by two tuple nodes $v_i$ and $v_j$)—then the weight $w_{ij}$ assigned to the edge $e_{ij}$ equals 0.1 (i.e., $w_{ij}=0.1$).

Using an object graph as described above, the AR analysis platform selects a diverse set of tuple combinations. To do so, the AR analysis platform determines to select a certain number of diverse tuple combinations set by a budget B (e.g., a budget B that specifies 2, 3, 4, or 5 diverse tuple combinations or (ultimately) recommendation messages). In some embodiments, the AR analysis platform selects a tuple node having a highest tuple-combination score. In such embodiments, the tuple combination corresponding to the selected tuple node is a first tuple combination of a diverse set of tuple combinations.

In other embodiments, the AR analysis platform selects an endorsed product identified by a digital marketer, by AR session data, by a highest association value, by a highest color-compatibility score, or by random selection. From among the tuple nodes corresponding to the selected endorsed product, the AR analysis platform selects a tuple node having a highest tuple-combination score associated with a particular endorsed product. In such embodiments, the tuple combination corresponding to the selected tuple node is a first tuple combination of a diverse set of tuple combinations.

After selecting a first tuple node using one of the embodiments described above, the AR analysis platform modifies the tuple-combination score assigned to each of the remaining tuple nodes (i.e., the unselected or yet-to-be selected tuple nodes). In some embodiments, the AR analysis platform modifies the tuple-combination score assigned to each of the remaining tuple nodes based on the weight assigned to each edge that connects the first selected tuple node to the remaining tuple nodes. In some such embodiments, the AR analysis platform reduces the tuple-combination score assigned to each of the remaining tuple nodes proportional to the similarity between a real-object tuple corresponding to the first selected tuple node and a real-object tuple corresponding to each of the remaining tuple nodes. In other words, the more similar a remaining tuple node's real-object tuple is to the first selected tuple node's real-object tuple, the more the AR analysis platform reduces the tuple-combination score of the remaining tuple node. Conversely, in some embodiments, the more different a remaining tuple node's real-object tuple is to the first selected tuple node's real-object tuple, the more the AR analysis platform increases the tuple-combination score of the remaining tuple node.

For example, in some embodiments, the AR analysis platform uses the following equation to modify the tuple-combination score assigned to each of the remaining tuple nodes:

$$\forall vj \text{ in } \{1,2,\ldots,|V|\}: r_j = r_j \times (1-w_{ij}) \qquad (6)$$

In equation (6), $v_j$ represents a remaining tuple node, $r_j$ represents the tuple-combination score of the remaining tuple node, $|V|$ denotes the number of nodes in the graph, and $w_{ij}$ represents the weight assigned to the edge $e_{ij}$ that connects the first selected tuple node $v_i$ and the remaining tuple node $v_j$. In some embodiments, after selecting a first tuple node, the AR analysis platform iteratively selects tuple nodes having a highest modified tuple-combination score—based on equation (6)—until the AR analysis platform has selected a predetermined number of tuple nodes (e.g., set by a budget). In such embodiments, the tuple combination corresponding to the selected tuple nodes comprise the diverse set of tuple combinations.

Figure 9A:
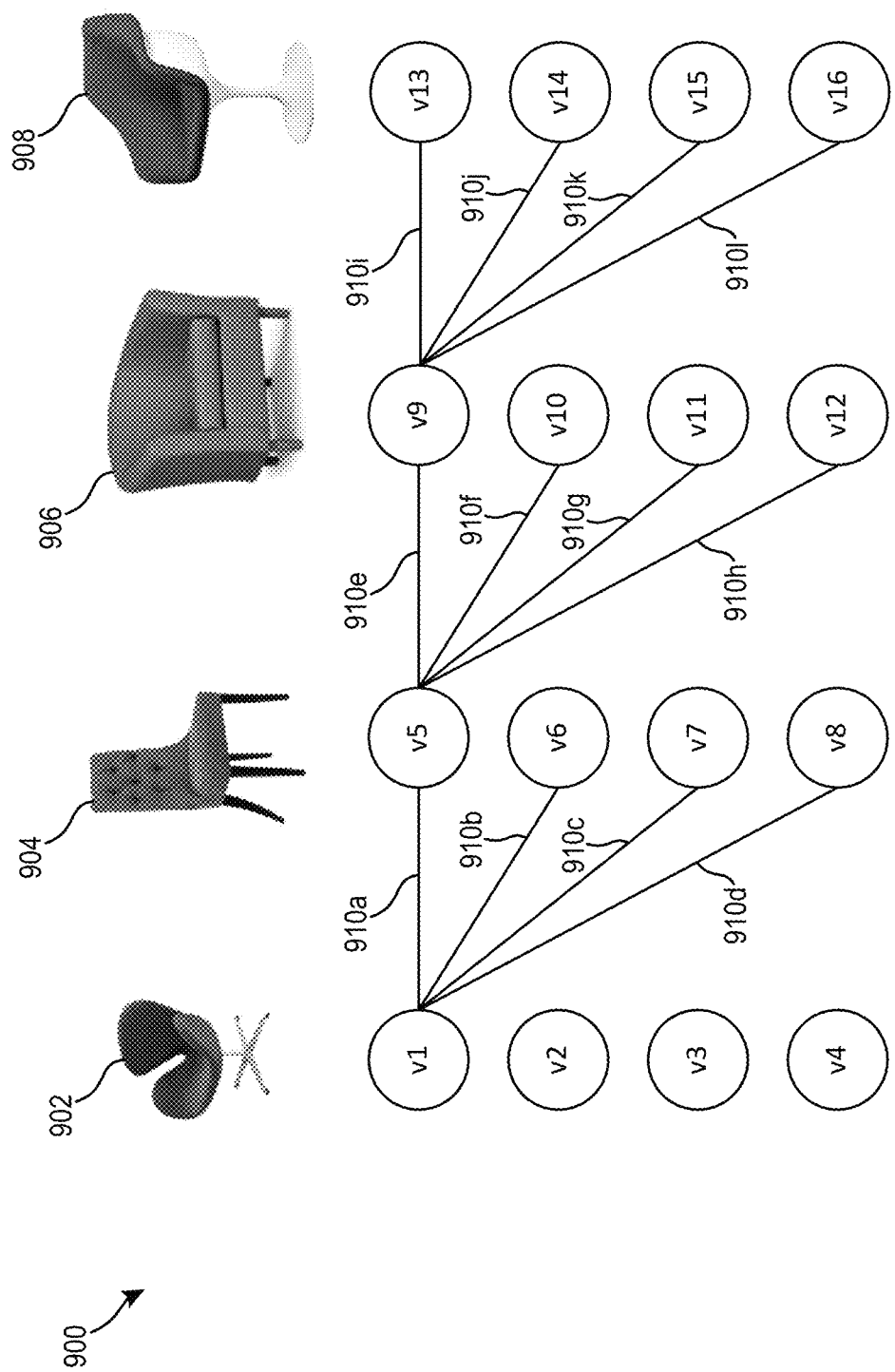
FIGS. 9A-9B illustrate object graphs in accordance with one or more embodiments.

FIG. 9A illustrates an object graph 900 that facilitates selecting a diverse set of tuple combinations. The object graph 900 comprises endorsed-product identifiers 902-908 and tuple nodes v1 through v16. Each of the endorsed-product identifiers 902-908 represent an endorsed product, and each of the tuple nodes v1 through v16 represent a real-object tuple. Accordingly, an association between one of the endorsed-product identifiers 902-908 and one of the tuple nodes represents a tuple combination.

Additionally, each of the endorsed-product identifiers 902-908 correspond to several tuples nodes, with endorsed-product identifier 902 corresponding to tuple nodes v1 through v4; endorsed-product identifier 904 corresponding to tuple nodes v5 through v8; endorsed-product identifier 906 corresponding to tuple nodes v9 through v12; and endorsed-product identifier 908 corresponding to tuple nodes v13 through v16. Because of space constraints, the object graph 900 shows merely some of many tuple nodes that correspond to one of the endorsed-product identifiers 902-908.

As shown in FIG. 9A, the object graph 900 further includes edges 910a-910l. Each of the edges 910a-910l connects one of the tuple nodes v1 through v16 to another tuple node. Consistent with the disclosure above, the AR analysis platform assigns a weight to each of the edges 910a-910l, where the weight assigned to each of the edges 910a-910l represents a similarity between a pair of connected tuple nodes of the tuple nodes v1 through v16. Because of space constraints, the object graph 900 shows merely some of many edges that connect tuple nodes corresponding to one of the endorsed-product identifiers 902-908. In a more precise illustration, an edge connects each of the tuple nodes v1 through v16 to each other.

The AR analysis platform selects a tuple node having a highest tuple-combination score—either from among all tuple nodes v1 through v16 or from among only certain tuple nodes corresponding to one of the endorsed-product identifiers 902-908. As shown in FIG. 9A, the AR analysis platform selects tuple node v1. Accordingly, the tuple combination corresponding to tuple node v1 is one tuple combination of a diverse set of tuple combinations.

Figure 9B:
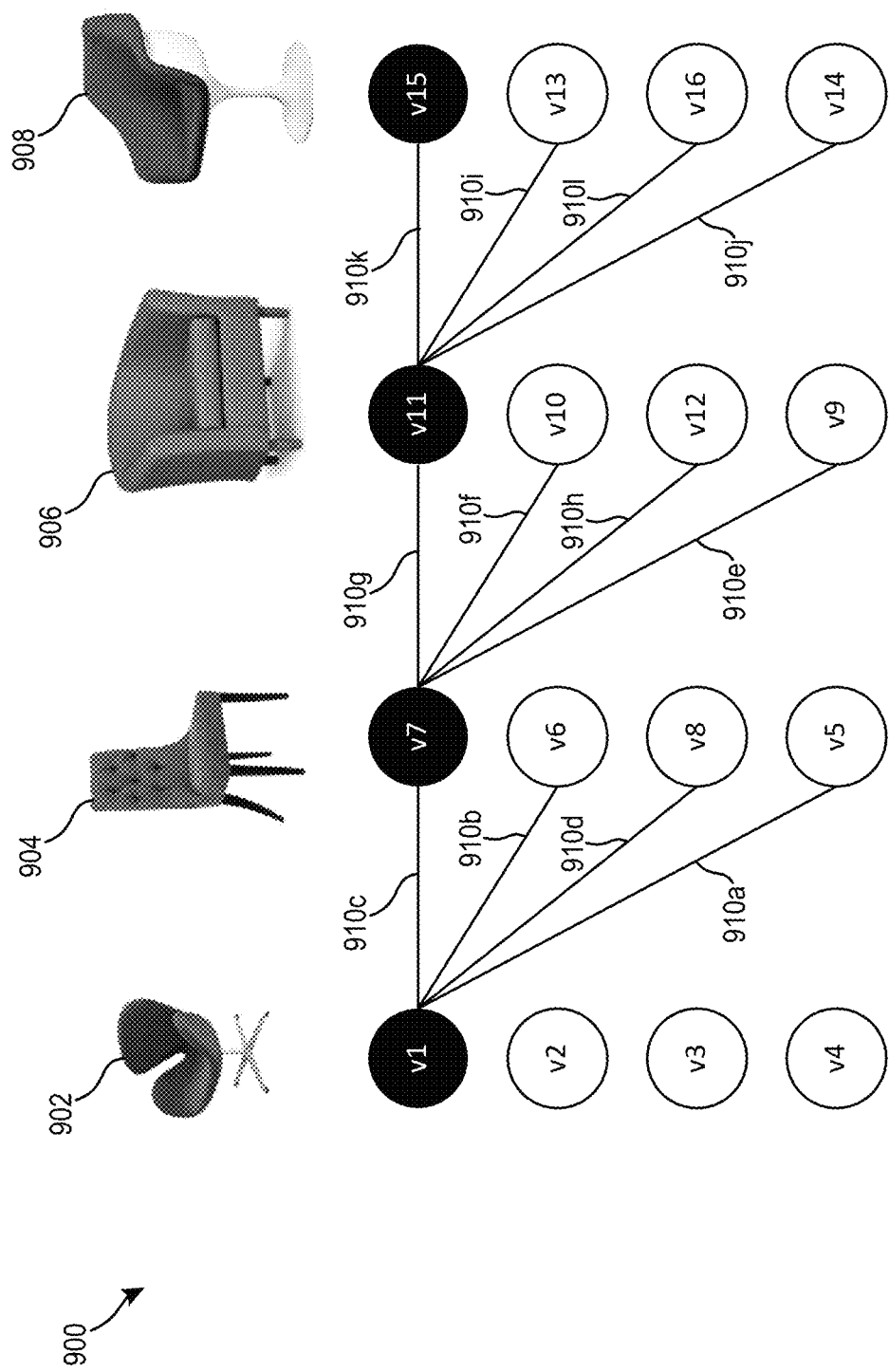
Figure 10A:
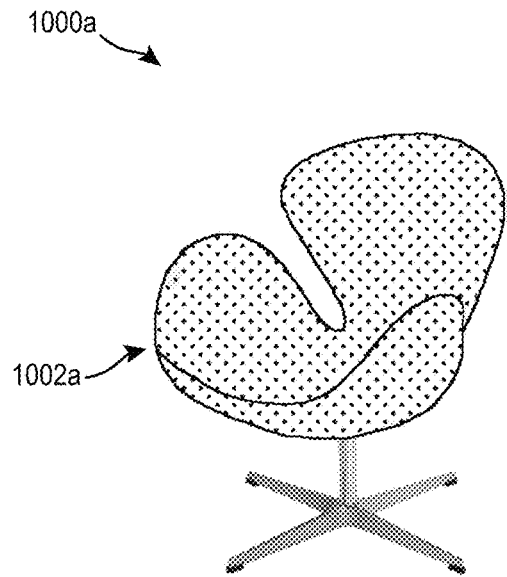
FIGS. 10A-10D illustrate product recommendations in accordance with one or more embodiments.
Figure 10B:
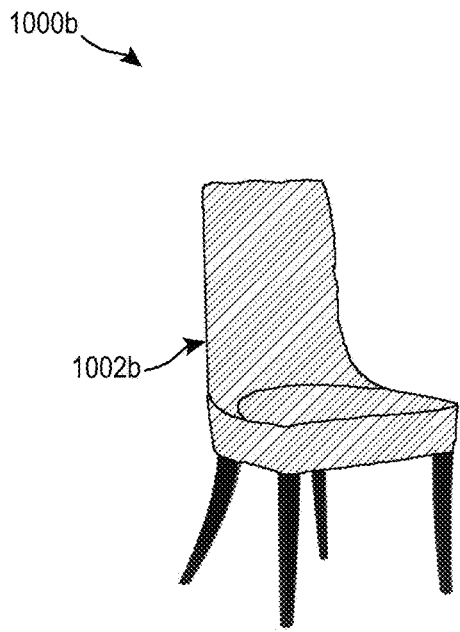
Figure 10C:
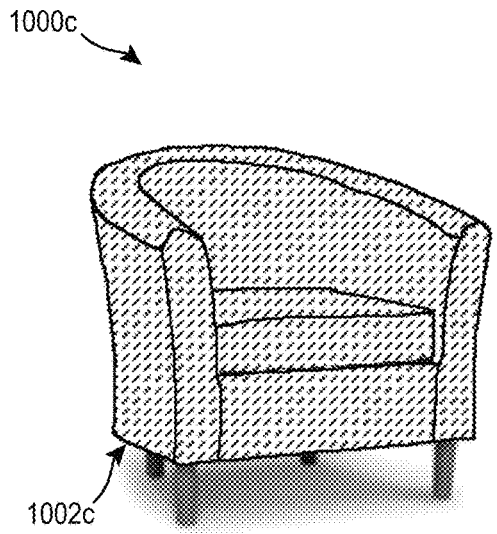
Figure 10D:
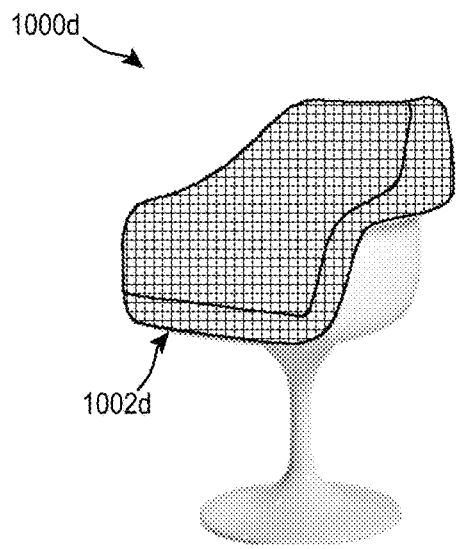

FIG. 9B illustrates the object graph 900 indicating that the AR analysis platform selects tuple nodes v1, v7, v11, and v15. Specifically, after selecting tuple node v1, the AR analysis platform modifies the tuple-combination scores assigned to the remaining tuple nodes v2 through v16 (and other tuple nodes not shown) by applying equation (6). The AR analysis platform then iteratively selects a tuple node having a highest modified tuple-combination score and further modifies the modified tuple-combination scores of the remaining tuple nodes until the AR analysis platform has selected a predetermined number of tuple nodes (e.g., according to a predetermined number set by a budget or by a default setting).

By iteratively selecting tuple nodes and applying equation (6), the AR analysis platform further selects tuple nodes v7, v11, and v15. Accordingly, the tuple combinations corresponding to tuple nodes v1, v7, v11, and v15 are tuple combinations of the diverse set of tuple combinations. As shown in FIG. 9B, tuple nodes v1, v7, v11, and v15 are darkened to indicate the AR analysis platform's selection.

In the embodiment shown in FIG. 9B, tuple node v1 corresponds to a tuple combination of "Purple Chair" and "<sofa, purple, front>"; tuple node v7 corresponds to a tuple combination of "Cyan Chair" and "<chair, orange, left>"; tuple node v11 corresponds to a tuple combination of "Green Chair" and "<rug, yellow, next>"; and tuple node v15 corresponds to a tuple combination of "Red Chair" and "<chair, pumpkin orange, right>." Accordingly, in this embodiment, the four tuple combinations just described comprise a diverse set of tuple combinations.

In addition to selecting an endorsed product or a diverse set of tuple combinations, in some embodiments, the AR analysis platform creates a product recommendation that recommends one or more endorsed products. For example, in some such embodiments, the AR analysis platform creates and sends a digital message that recommends an endorsed product based on the generated tuple-combination scores (e.g., a recommendation of the endorsed product corresponding to the tuple combination having a highest tuple-combination score). Depending on the embodiment, the digital message may comprise a digital advertisement, an email, a text, a social media post, or a video showing the endorsed product.

In some embodiments, the AR analysis platform (directly or indirectly) sends a digital message to a client device from which AR session data originated. For example, the AR analysis platform optionally sends a digital message to the client device, where the digital message causes the client device to present one or more endorsed products within an AR scene. Depending on the message, the digital message causes the client device to present an endorsed product within a dynamic, digital, three-dimensional view of the AR scene or a static, two-dimensional, digital image of the AR scene. In both instances, the digital message directs the AR client application (or a server to direct an AR client application) to superimpose (or integrate within) the endorsed product as a virtual object within an AR scene. By sending such digital messages, the AR analysis platform creates product recommendations that direct an AR client application to show endorsed products that a user can, for example, try on virtually (e.g., suggested clothing or accessories for a user within an AR scene) or place virtually within an AR scene (e.g., suggested furniture within an AR scene of a specific room or environment).

In some such embodiments, the AR analysis platform sends a digital message to the client device that causes the client device to present a digital image of an AR scene—comprising one or more endorsed products that the AR analysis platform recommends with one or more real objects—from a same viewpoint as the digital image that the AR analysis platform analyzed to create the product recommendation. For example, the digital message causes the client device to present a digital image substantially similar to a screenshot that formed the basis of the AR analysis platform's product recommendation, except that the digital image includes the endorsed product in the place of the virtual object originally part of an AR scene. Alternatively, the digital message causes the client device to present a dynamic, digital, three-dimensional view of the AR scene where the initial view of the AR scene superimposes the endorsed product on a dynamic, digital, three-dimensional view of a real scene.

Additionally, in some embodiments, the AR analysis platform generates multiple recommendation messages that each recommend a different endorsed product. For example, the AR analysis platform optionally generates multiple recommendation messages that recommend endorsed products that correspond to tuple combinations having a number of the highest tuple-combination scores, but for tuple combinations comprising different endorsed products. To provide an example, the AR analysis platform may generate multiple recommendation messages that recommend four different endorsed products. In this example, the four different endorsed products correspond to tuple combinations that comprise different endorsed products and—after eliminating tuple combinations with a same endorsed product—that have the four highest tuple-combination scores.

When creating product recommendations, the AR analysis platform optionally embeds or inserts a tuple combination (or a diverse set of tuple combinations) within one or more template messages. To do so, in some embodiments, the AR analysis platform inserts elements of a tuple combination (e.g., from the diverse set of tuple combinations) within placeholders of a template message. In certain embodiments, a template message includes placeholders that correspond to each element of a tuple combination, such as an endorsed-product placeholder, a relative-position placeholder, a real-object-color placeholder, and a real-object-type placeholder that respectively correspond to an endorsed product, virtual object's relative position, real-object color, and real-object type of a tuple combination.

For example, before inserting elements of a tuple combination within a template message, the AR analysis platform may identify a template message that says, "We want you to check out this [endorsed-product placeholder] if placed [relative-position placeholder] [of/to] your [real-object-color placeholder] [real-object-type placeholder]." The AR analysis platform may additionally identify a first selected tuple combination of a diverse set of tuple combinations that comprises "Purple Chair" as the endorse product and "<sofa, purple, front>" as the real-object tuple. By inserting elements of the first selected tuple combination within their respective placeholders, the AR analysis platform creates a recommendation message that says, "We want you to check out this purple chair if placed in front of your purple sofa." The AR analysis platform would similarly insert elements of a second, third, fourth, or however many selected tuple combinations (from the diverse set of tuple combinations) within placeholders of different template messages to create multiple (yet different) recommendation messages.

FIGS. 10A-10D illustrate product recommendations 1000a-1000d that result from embedding elements of tuple combinations within message templates. Each of the product recommendations 1000a-1000d include different respective endorsed products, including an endorsed product 1002a shown in FIG. 10A, an endorsed product 1002b shown in FIG. 10B, an endorsed product 1002c shown in FIG. 10C, and an endorsed product 1002d shown in FIG. 10D. Each of the product recommendations 1000a-1000d likewise include different respective recommendation messages, including a recommendation message 1004a shown in FIG. 10A, a recommendation message 1004b shown in FIG. 10B, a recommendation message 1004c shown in FIG. 10C, and a recommendation message 1004d shown in FIG. 10D.

Consistent with the disclosure above, the AR analysis platform creates each of the recommendation messages 1004a-1004d by inserting elements of four tuple combinations (from a diverse set of tuple combinations) within placeholders of different template messages. After creating the recommendation messages 1004a-1004d, the AR analysis platform combines each of the endorsed products 1002a-1002d with their respective recommendation messages 1004a-1004d to create the product recommendations 1000a-1000d. After creating each of the product recommendations 1000a-1000d, the AR analysis platform sends a digital message comprising each of the product recommendations 1000a-1000d, such as by sending a digital advertisement, an email, a text, or a social media post to a client device or to a marketing server.

Figure 11:
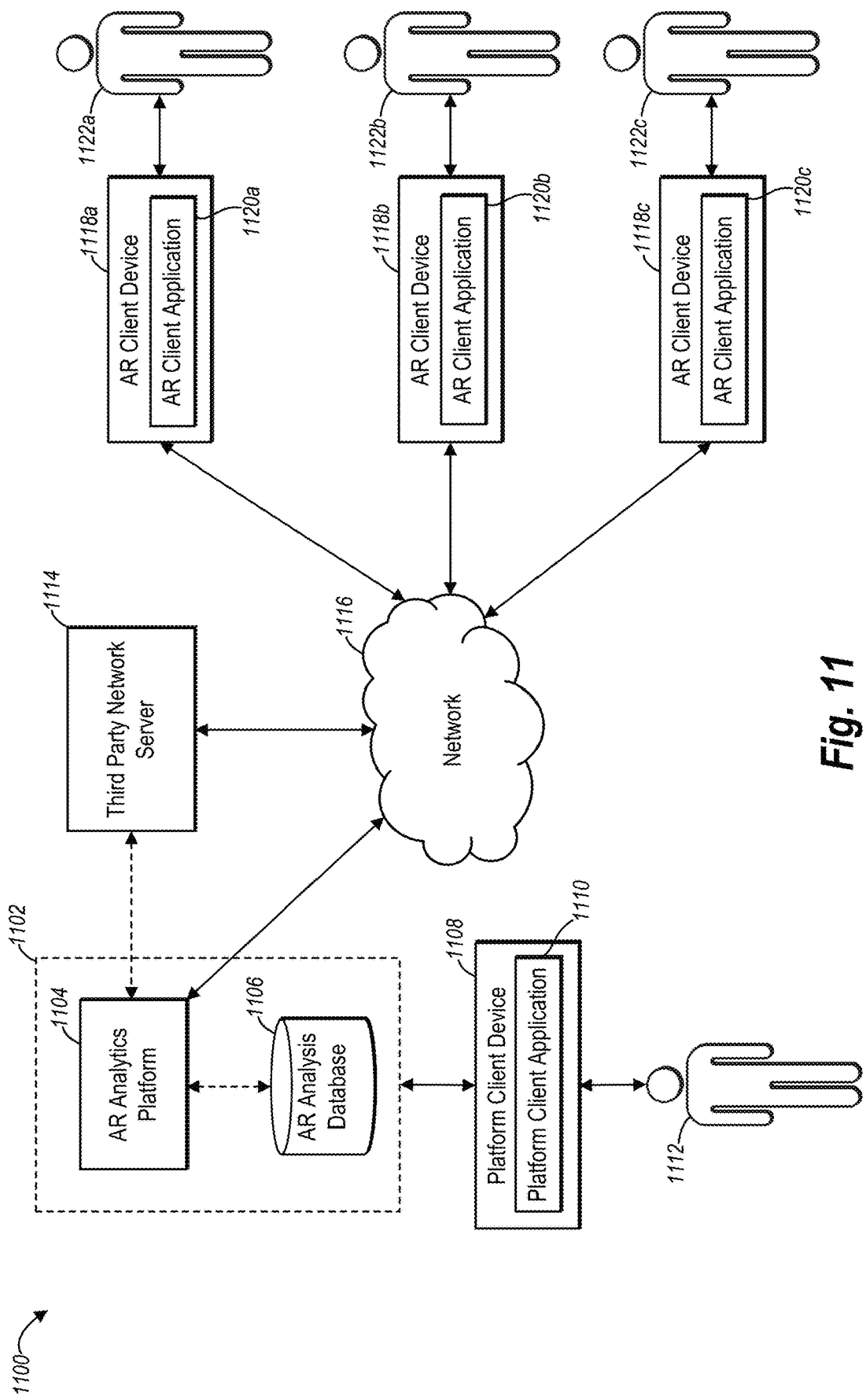
FIG. 11 illustrates a block diagram of an environment in which an AR analysis system can operate in accordance with one or more embodiments.
Figure 12:
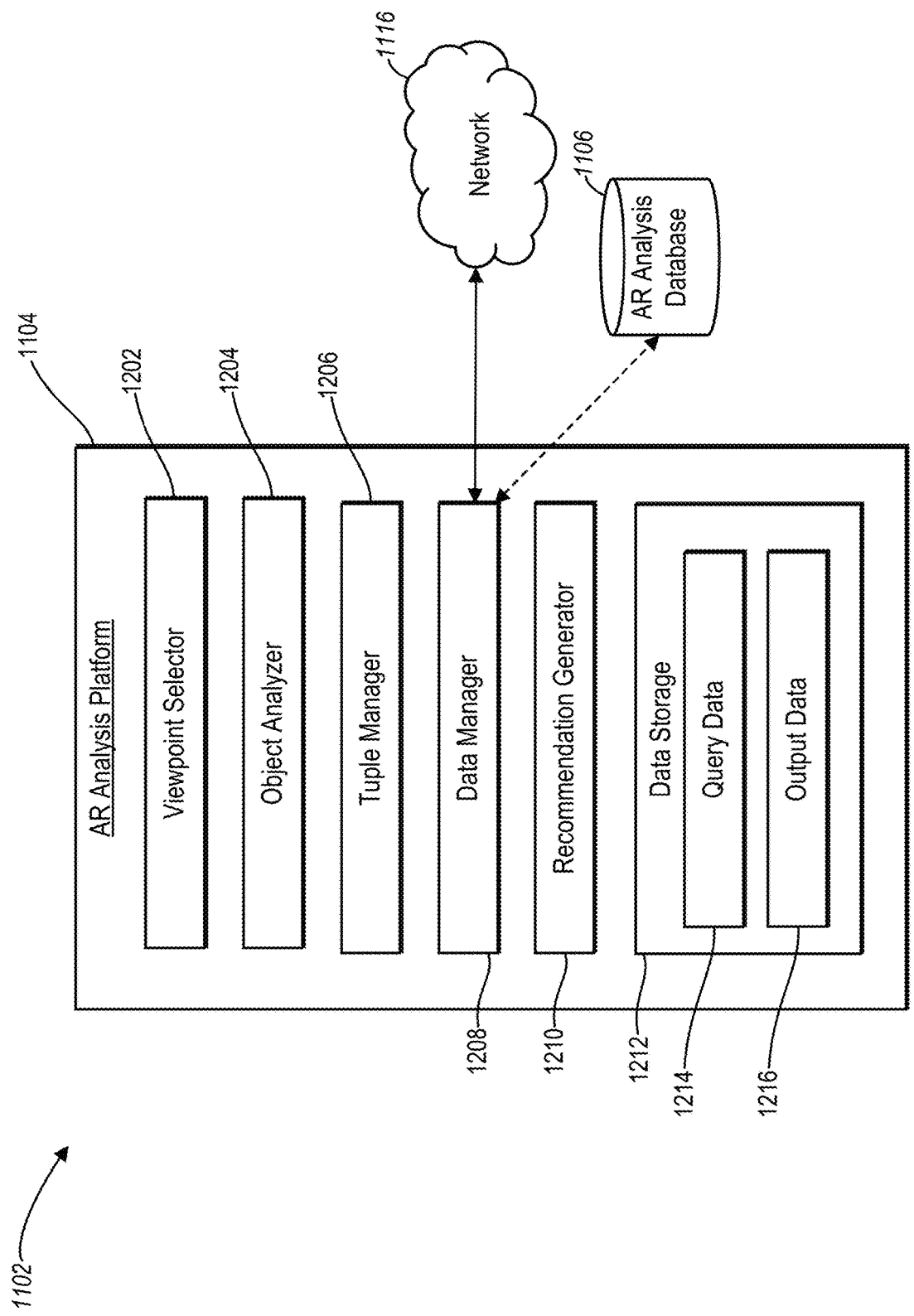
FIG. 12 illustrates a schematic drawing of an AR analysis system of FIG. 11 in accordance with one or more embodiments.

Turning now to FIGS. 11 and 12, these figures provide an overview of an environment in which an AR analysis system can operate and an example of an architecture for an AR analysis platform. FIG. 11 is a block diagram illustrating an environment 1100 in which an AR analysis system 1102 can operate in accordance with one or more embodiments. As illustrated in FIG. 11, the environment 1100 includes the AR analysis system 1102; a platform client device 1108; an administrator 1112; third-party network server(s) 1114, such as web server(s); AR client devices 1118a, 1118b, and 1118c; users 1122a, 1122b, and 1222c; and a network 1116, such as the Internet.

As further illustrated in FIG. 1, the platform client device 1108 and the AR client devices 1118a-1118c communicate with the third-party network server(s) 1114 (and, in some embodiments, the AR analysis platform 1104) through the network 1116. Although FIG. 1 illustrates an arrangement of the platform client device 1108, the administrator 1112, the AR client devices 1118a-1118c, the users 1122a-1222c, the network 1116, the third-party network server(s) 1114, and the AR analysis system 1102, various additional arrangements are possible. For example, the AR client devices 1118a-1118c may directly communicate with the third-party network server(s) 1114 and thereby bypass the network 1116. Similarly, the platform client device 1108 may communicate with the AR analysis system 1102 through the network 1116 rather than directly communicating with the AR analysis system 1102.

As shown in FIG. 1, the users 1122a-1122c comprise users who access one or more AR applications, AR websites, or other digital content provided (in whole or in part) by the third-party network server(s) 1114. In particular, the third-party network server(s) 1114 provide data to the AR client devices 1118a-1118c that enable AR client applications 1120a-1120c to insert virtual objects into a real scene to create an AR scene. While FIG. 1 illustrates three users 1122a-1122c, in alternative embodiments, the environment 1100 includes fewer or more than three users 1122a-1122c. For example, in other embodiments, the environment 1100 includes hundreds, thousands, millions, or billions of users.

As also shown in FIG. 1, the AR analysis system 1102 includes the AR analysis platform 1104 and an AR analysis database 1106. The AR analysis platform 1104 accesses, manages, analyzes, and queries data corresponding to some or all of the users 1122a-1122c, including AR session data. For example, the AR analysis platform 1104 accesses and analyzes AR session data corresponding to some or all of the users 1122a-1122c that is stored within the AR analysis database 1106. Additionally, in some embodiments, the AR analysis platform 1104 accesses, manages, analyzes, and queries data corresponding to other users associated with the third-party network server(s) 1114.

In one or more embodiments, the AR client devices 1118a-1118c transmit some or all of the data (corresponding to some or all of the users 1122a-1122c) through the network 1116 to the third-party network server(s) 1114. To generate the transmitted data or initiate communications, the users 1122a-1122c interact with the AR client devices 1118a-1118c, respectively. The AR client devices 1118a-1118c may include, but are not limited to, mobile devices (e.g., smartphones, tablets), laptops, desktops, or any other type of computing device, such as those described below in relation to FIG. 15. Similarly, the network 1116 may comprise any of the networks described below in relation to FIG. 15.

In one or more embodiments, the AR analysis platform 1104 tracks various user data related to the communications between the AR client devices 1118a-1118c and the third-party network server(s) 1114, including any AR session data. For example, the AR analysis platform 1104 tracks user data that represents digital images captured by an AR client device during an AR session; a virtual object superimposed on (or integrated within) the digital images to create an AR scene, including the virtual object's color, position, object type, or product name; and gyroscopic data or accelerometer data indicating a client device's orientation and motion.

When tracking user data, the third-party network server(s) 1114 may comprise a webserver that includes a catalogue or menu of endorsed products and supports generation of AR scenes comprising the endorsed products as virtual objects. In some such instances, the AR client device 1118a communicates with the third-party network server(s) 1114 to request data to show within an AR scene on a graphical user interface of the AR client device 1118a. By accessing the communications from the AR client device 1118a to the third-party network server(s) 1114, the AR analysis platform 1104 tracks the data request (e.g., for virtual objects to appear in an AR scene), the name and color of endorsed products requested, the date and time the request was made, the application used to make the request, the operating system used by the requesting AR client device 1118a, or any other AR session data corresponding to an AR session of a user.

The AR analysis platform 1104 tracks user data in various ways. In one or more embodiments, the third-party network server(s) 1114 tracks the user data and then reports the tracked user data to the AR analysis platform 1104. Alternatively, the AR analysis system 1102 receives tracked user data directly from the AR client devices 1118a-1118c. In particular, the AR analysis system 1102 may receive information through data stored on an AR client device (e.g., application metadata, a browser cookie, cached memory), embedded computer code (e.g., tracking pixels), a user profile, or engage in any other type of tracking technique. Accordingly, the AR analysis platform 1104 can receive tracked user data from the third-party network server(s) 1114, the network 1116, and/or the AR client devices 1118a-1118c.

As also illustrated in FIG. 11, the AR analysis platform 1104 is communicatively coupled to an AR analysis database 1106. In one or more embodiments, the AR analysis platform 1104 accesses and queries AR session data from the AR analysis database 1106 or sends data to the AR analysis database 1106. As shown in FIG. 11, the AR analysis database 1106 is separately maintained from the AR analysis platform 1104. Alternatively, in one or more embodiments, the AR analysis platform 1104, and the AR analysis database 1106 comprise a single combined system, subsystem, or device.

As also shown in FIG. 11, the environment 1100 includes the platform client device 1108 that implements a platform client application 1110. In one or more embodiments, an administrator 1112 or other user queries data from the AR analysis platform 1104 by using the platform client device 1108. For example, in some embodiments, the AR analysis platform 1104 provides various graphical user interface controls to the platform client application 1110 within the platform client device 1108 to enable the administrator 1112 to query the AR analysis system 1102 for, e.g., product recommendations or digital messages sent to AR client devices 1118a-1118c or AR session data analyzed by the AR analysis platform 1104.

Turning now to FIG. 12, this figure illustrates a schematic diagram of one embodiment of the AR analysis system 1102. As shown, the AR analysis system 1102 includes, but is not limited to, the AR analysis platform 1104 communicatively coupled to the network 1116 and the AR analysis database 1106. The AR analysis platform 1104 includes, but is not limited to, a viewpoint selector 1202, an object analyzer 1204, a tuple manager 1206, a data manager 1208, a recommendation generator 1210, and a data storage 1212. In some embodiments, the AR analysis system 1102 includes or is coupled to the AR analysis database 1106, as indicated by the dotted line in FIG. 12.

As shown in FIG. 12, the viewpoint selector 1202 determines a viewpoint of an AR scene that interests a user (e.g., a threshold-instant viewpoint or a longest-constant viewpoint). Consistent with the disclosure above, the viewpoint selector 1202 determines when a user (during an AR session) spends more time than a threshold timeframe or a longest time—in each case without changing the virtual object's orientation and/or without moving the client device. When doing so, the viewpoint selector 1202 receives and analyzes digital images and accompanying AR session data (from an AR client device or the third-party network server(s) 1114) while the user considers one or more viewpoints of an AR scene or shortly after the user considers one or more viewpoints of an AR scene.

As also shown in FIG. 12, the object analyzer 1204 analyzes the visual information of a digital image or screenshot from an AR session. Consistent with the disclosure above, the object analyzer 1204 identifies real objects and virtual objects within an AR scene, determines a location and/or color of any real objects within an AR scene, determines a relative position of a virtual object with respect to one or more real objects within an AR scene, identifies a color of any virtual objects, and determines whether a color of a real object is compatible with a color of an endorsed product. As for the latter function, in some embodiments, the object analyzer 1204 generates color-compatibility scores for various object-color combinations.

Additionally, and as shown in FIG. 12, the tuple manager 1206 analyzes and generates tuple data and scores associated with the AR analysis platform 1104. Specifically, the tuple manager 1206 generates real-object tuples corresponding to one or more real objects, generates tuple-combination scores, and selects tuple combinations, including a selection of a diverse set of tuple combinations. When generating tuple-combination scores, the tuple manager 1206 also generates or identifies various scoring factors, including object-label-confidence scores, color-compatibility scores (identified from within the object analyzer 1204), association values, position weights, and color-detail weights. Alternatively, the tuple manager 1206 receives (indirectly) and identifies various scoring factors from third-party network server(s) 1114.

To facilitate managing data used by the AR analysis platform 1104, in some embodiments, the AR analysis platform 1104 also includes a data manager 1208. As shown in FIG. 12, the data manager 1208 receives, organizes, and/or stores user data from the network 1116, the third-party network server(s) 1114, and/or the AR client devices 1118a-1118c (e.g., the data manager 1208 performs read/write functions in connection with a database). For example, in one or more embodiments, the AR analysis platform 1104 accesses AR session data related to an AR client application usage provided or supported by the third-party network server(s) 1114.

The data manager 1208 identifies information within the AR analysis database 1106 or the data storage 1212 based on a query. For example, in some embodiments, the data manager 1208 receives a query from the viewpoint selector 1202 to access AR session data, including queries to identify and extract digital images and capture screenshots related to an AR session.

Additionally, in some embodiments, the AR analysis platform 1104 sends digital images to a CNN for analysis consistent with the disclosure above. In such embodiments, the data manager 1208 receives a query and/or digital images from the object analyzer 1204, sends the query and/or digital images to the CNN (e.g., as part of one of the third-party network server(s) 1114), and receives outputs from the CNN for relay to the object analyzer 1204 (e.g., object proposals, object labels, object-label-confidence scores).

Similarly, in some embodiments, the AR analysis platform 1104 sends queries to the third-party network server(s) 1114 to obtain information concerning color models. In some such embodiments, the data manager 1208 receives a query concerning color themes or crowd-source ratings from the object analyzer 1204, sends the query and/or digital images to the relevant third-party network server(s) 1114, and receives information concerning the color models for relay to the object analyzer 1204.

In addition to receiving queries, in some embodiments, the data manager 1208 receives scores, scoring factors, or data generated by the object analyzer 1204 or the tuple manager 1206. For example, in some cases, the data manager 1208 receives object-color combinations or color-compatibility scores generated by the object analyzer 1204 or real-object tuples, tuple combinations, tuple-combination scores, or diverse sets of tuple combinations generated by the tuple manager 1206 and stores the data as output data 1216.

In one or more embodiments, the data manager 1208 organizes AR session data according to the user, application, website, AR session, virtual objects, timestamp, or some other variable. Additionally, upon generating a data in response to a query from the viewpoint selector 1202, the object analyzer 1204, or the tuple manager 1206, the data manager 1208 optionally stores the query results (e.g., object proposals, object labels, object-label-confidence scores, crowd-source ratings, color themes, viewpoint data, digital images, screenshots) as dataset for later access, such as by storing the query as query data 1214 within the data storage 1212. Additionally, upon generating a dataset, the data manager 1208 optionally transmits or communicates with the recommendation generator 1210.

As indicated earlier, in some embodiments, the AR analysis platform 1104 further includes the recommendation generator 1210. The recommendation generator 1210 receives data from the data manager 1208—such as tuple-combination scores or diverse sets of tuple combinations—for analysis or identification. The recommendation generator 1210 also creates and sends product recommendations. For example, in some embodiments, the recommendation generator 1210 embeds or inserts elements of a diverse set of tuple combinations within multiple template messages. The recommendation generator 1210 likewise (and optionally) sends digital messages through the network 1116 (and sometimes through the third-party network server(s) 1114) to the AR client devices 1118*a*-1118*c*.

As also shown in FIG. 12, the AR analysis platform 1104 includes the data storage 1212. The data storage 1212 maintains query data 1214 and output data 1216. In one or more embodiments, the query data 1214 comprises queries received by the data manager 1208, including queries from the viewpoint selector 1202, object analyzer 1204, and tuple manager 1206, as described above. Moreover, in some embodiments, the output data 1216 includes scores, scoring factors, digital images, and other outputs from the viewpoint selector 1202, object analyzer 1204, and tuple manager 1206, as described above.

Figure 13:
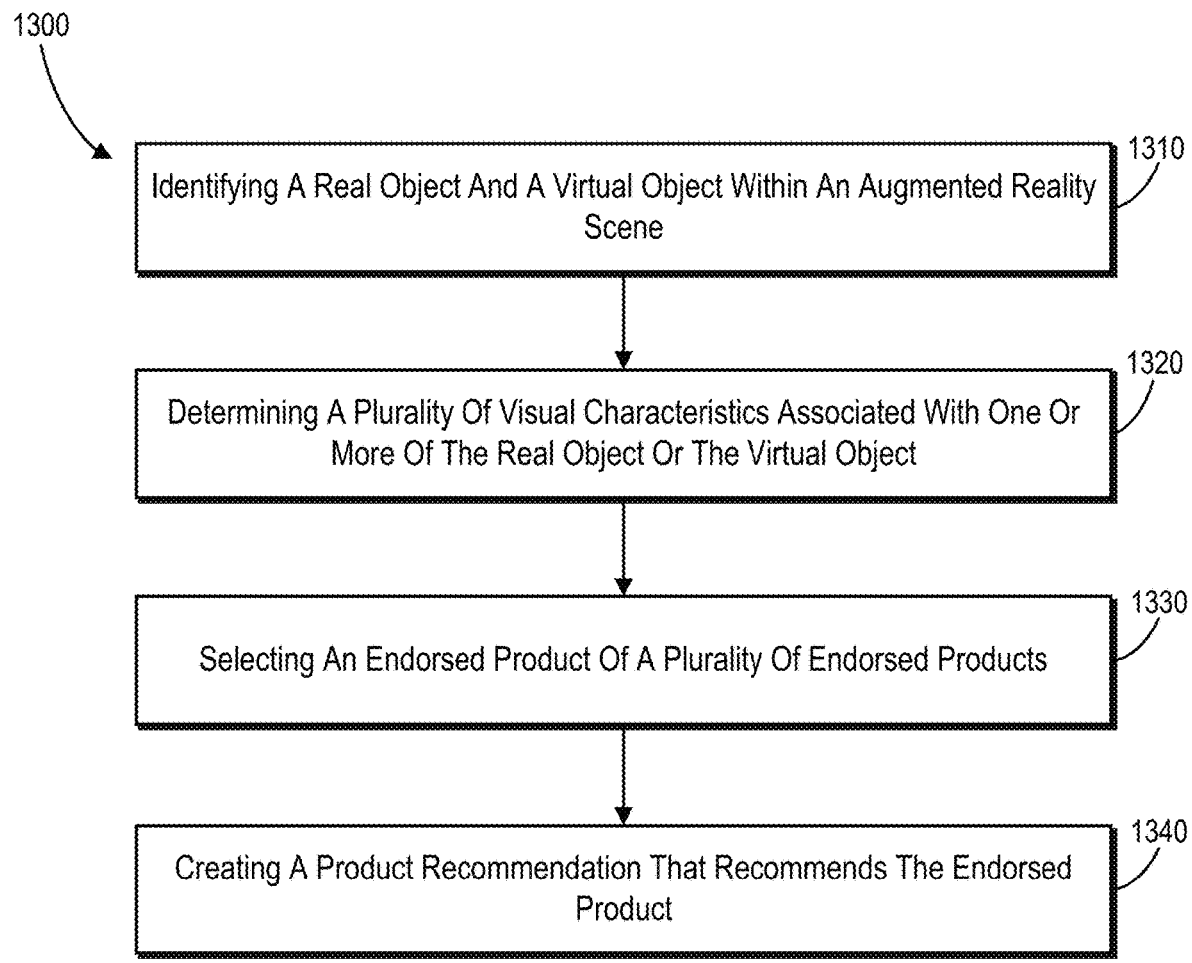
FIG. 13 illustrates a flowchart of a series of acts in a method of generating recommendations of endorsed products using characteristics extracted from augmented reality scenes in accordance with one or more embodiments.

Turning now to FIG. 13, this figure illustrates a flowchart of series of acts in a method 1300 of generating recommendations of endorsed products using characteristics extracted from augmented reality scenes. As shown in FIG. 13, the method 1300 includes an act 1310 of identifying a real object and a virtual object within an augmented reality scene. For example, in some embodiments, identifying the real object and the virtual object within the augmented reality scene comprises: applying a Region-based Convolutional Neural Network to a digital image of the augmented reality scene; and generating object proposals for each of the real object and the virtual object, the object proposals each comprising an object label and an object-label-confidence score. Additionally, in one or more embodiments, the real object comprises a plurality of real objects.

As also shown in FIG. 13, the method 1300 also includes an act 1320 of determining a plurality of visual characteristics associated with the real object or the virtual object. In particular, the act 1320 can include, based on visual information from the augmented reality scene, determining a plurality of visual characteristics associated with the real object or the virtual object.

In one or more embodiments, determining the plurality of visual characteristics associated with the real object or the virtual object comprises: determining a color of the real object based on visual information from the augmented reality scene; and determining a relative position of the virtual object with respect to the real object based on visual information from the augmented reality scene.

In some such embodiments, determining the color of the real object comprises determining a shade and a hue of the real object. Similarly, in some embodiments, determining the color of the real object comprises determining a dominant color of an object within a bounding box, wherein the bounding box surrounds the real object and the dominant color is expressed by a hex code.

As also shown in FIG. 13, the method 1300 also includes an act 1330 of selecting at least one endorsed product of a plurality of endorsed products. In particular, the act 1330 can include, based on the determined plurality of visual characteristics, selecting at least one endorsed product of a plurality of endorsed products to recommend for using with the real object.

In one or more embodiments, selecting the at least one endorsed product to recommend for using with the real object comprises creating a plurality of real-object tuples corresponding to the real object, wherein the plurality of real-object tuples each comprise: a real-object type that identifies a type of the real object; a real-object color that identifies a color of the real object; and the virtual object's relative position with respect to the real object. Relatedly, in one or more embodiments, the plurality of real-object tuples comprises: a first real-object tuple comprising a real-object type that identifies a type of the real object, a real-object shade that identifies a shade of the real object, and the virtual object's relative position with respect to the real object; and a second real-object tuple comprising the real-object type, a real-object hue that identifies a hue of the real object, and the virtual object's relative position with respect to the real object.

Additionally, in one or more embodiments, selecting the at least one endorsed product to recommend for using with the real object further comprises: generating a color-compatibility score for each of a plurality of object-color combinations, the plurality of object-color combinations comprising a color of the real object in combination with each of a plurality of colors corresponding to each of the plurality of endorsed products; based on a collection of scoring factors, generating a tuple-combination score for each of a plurality of tuple combinations, wherein the plurality of tuple combinations comprises each of the plurality of real-object tuples in combination with each of the plurality of endorsed products and wherein the scoring factors comprise at least the color-compatibility score for each of the plurality of object-color combinations.

Relatedly, in one or more embodiments, generating the color-compatibility score for each of the plurality of object-color combinations comprises applying a Lasso Regression model using a color palette. Additionally, in one or more embodiments, selecting the at least one endorsed product to recommend for using with the real object based on the determined plurality of visual characteristics further comprises selecting a diverse set of tuple combinations from among the plurality of tuple combinations.

In one or more embodiments, generating a tuple-combination score for each of a plurality of tuple combinations further comprises generating the collection of scoring factors, including generating a first collection of scoring factors and a second collection of scoring factors, wherein: generating the first collection of scoring factors comprises generating each of: an object-label-confidence score corresponding to the real object; a first color-compatibility score corresponding to a first object-color combination of the plurality of object-color combinations between the color of the real object and a first color of a first endorsed product of the plurality of endorsed products; a first association value corresponding to an association between the real object and the first endorsed product; a first position weight corresponding to a relative position of the first endorsed product with respect to the real object; and a color-detail weight corresponding to the real object's color; and generating the second collection of scoring factors comprises generating each of: the object-label-confidence score corresponding to the real object; a second color-compatibility score corresponding to a second object-color combination of the plurality of object-color combinations between the color of the real object and a second color of a second endorsed product of the plurality of endorsed products; a second association value corresponding to an association between the real object and the second endorsed product; a second position weight corresponding to a relative position of the second endorsed product with respect to the real object; and the color-detail weight corresponding to the real object's color.

Furthermore, in one or more embodiments, selecting the at least one endorsed product of the plurality of endorsed products to recommend for using with the real object comprises: creating an object graph comprising a plurality of tuple nodes connected by a plurality of edges, wherein each of the plurality of tuple nodes represents a corresponding tuple combination of the plurality of tuple combinations; assigning the tuple-combination score for each of the plurality of tuple combinations to each of the plurality of tuple nodes; assigning a weight to each of the plurality of edges, wherein the weight assigned to each of the plurality of edges represents a similarity between a pair of connected tuple nodes of the plurality of tuple nodes; and selecting a diverse set of tuple combinations from among the plurality of tuple combinations based on the object graph.

In addition to creating the object graph, in one or more embodiments, selecting the diverse set of tuple combinations from among the plurality of tuple combinations comprises: selecting a first tuple node of the plurality of tuple nodes, wherein the first tuple node has a highest tuple-combination score and corresponds to a first tuple combination of the plurality of tuple combinations; modifying the tuple-combination score assigned to each of a remaining plurality of tuple nodes of the plurality of tuple nodes based on the weight assigned to each of a set of edges of the plurality of edges that connect the first tuple node to the remaining plurality of tuple nodes; selecting a second tuple node of the remaining plurality of tuple nodes, wherein the second tuple node has a highest modified tuple-combination score and corresponds to a second tuple combination of the plurality of tuple combinations; and selecting the first tuple combination and the second tuple combination as part of the diverse set of tuple combinations.

In addition to selecting the first and second tuple nodes, in one or more embodiments, selecting the diverse set of tuple combinations from among the plurality of tuple combinations further comprises: further modifying the modified tuple-combination score assigned to each of an additional remaining plurality of tuple nodes of the remaining plurality of tuple nodes based on the weight assigned to each of an additional set of edges of the plurality of edges that connect the second tuple node to the additional remaining plurality of tuple nodes; selecting a third tuple node of the additional remaining plurality of tuple nodes, wherein the third tuple node has a highest further modified tuple-combination score and corresponds to a third tuple combination of the plurality of tuple combinations; and selecting the first tuple combination, the second tuple combination, and the third tuple combination as part of the diverse set of tuple combinations.

As also shown in FIG. 13, the method 1300 also includes an act 1340 of creating a product recommendation that recommends the selected at least one endorsed product. For example, in some such embodiments, creating the product recommendation that recommends the selected at least one endorsed product comprises creating a plurality of recommendation messages by embedding the diverse set of tuple combinations within template messages, wherein each of the plurality of recommendation messages recommends a different endorsed product of the plurality of endorsed products.

Additionally, in some embodiments, the method 1300 further comprises, before identifying the real object and the virtual object within the augmented reality scene, determining a viewpoint of the augmented reality scene that a user views for a threshold timeframe without changing the virtual object's orientation and without moving a client device that generates the augmented reality scene.

Moreover, in one or more embodiments, the method 1300 further comprises, generating a plurality of recommendation messages that each recommend a different endorsed product of the plurality of endorsed products; and sending a digital message comprising at least one recommendation message of the plurality of recommendation messages.

Figure 14:
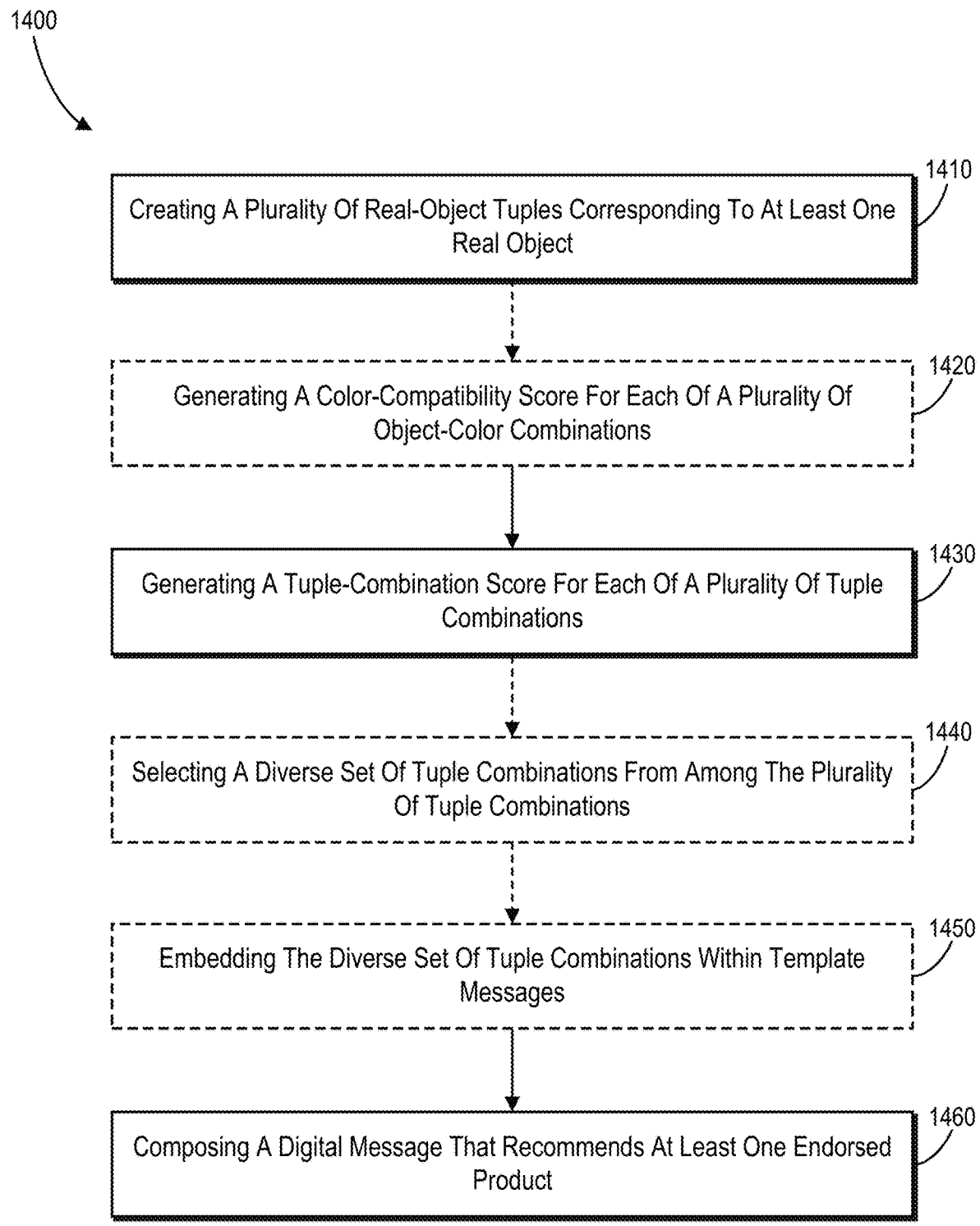
FIG. 14 illustrates an algorithm comprising a series of acts corresponding to a step for generating a product recommendation in accordance with one or more embodiments.

In addition to the methods described above, in some embodiments, the method 1300 includes a step for generating a product recommendation. For example, in some such embodiments, the method 1300 includes a step for generating a product recommendation that recommends at least one endorsed product of a plurality of endorsed products based on the determined plurality of visual characteristics. FIG. 14 illustrates an algorithm that comprises acts that correspond to the step for generating a product recommendation.

Specifically, FIG. 14 illustrates an algorithm 1400 that corresponds to one or more embodiments of performing a step for generating a product recommendation. While FIG. 14 illustrate algorithms according to one or more embodiments, alternative embodiments may omit, add to, reorder, and/or modify any of the acts shown in FIG. 14. Further, the AR analysis platform 1104, the platform client device 1108, or a combination of both, may perform one or more of the acts of the algorithm 1400.

As shown in FIG. 14, the algorithm 1400 includes an act 1410 of creating a plurality of real-object tuples corresponding to real object. In some such embodiments, the plurality of real-object tuples each comprise one or more of the following tuple elements: a real-object type that identifies a type of the real object; a real-object color that identifies a color of the real object; and the virtual object's relative position with respect to the real object. In other words, a real-object tuple may include any combination of the tuple elements described above. Consistent with the disclosure above, the real-object color may include a hue or a shade, as described above and as demonstrated by embodiments shown and described in connection with FIG. 6. Additionally, an alternate word may be used to describe the virtual object's relative position, as described above and as demonstrated by embodiments shown and described in connection with FIGS. 5C and 6.

Additionally or alternatively, in some embodiments, the algorithm optionally includes an act 1420 of generating a color-compatibility score for each of a plurality of object-color combinations. In some such embodiments, the plurality of object-color combinations comprises a color of the real object in combination with each of a plurality of colors corresponding to each of the plurality of endorsed products, as described above.

To illustrate, in some embodiments, the act 1420 includes inputting color palettes—that include an object-color combination within each color palette—into a Lasso Regression model to produce color-compatibility scores, consistent with the disclosure above and as demonstrated by embodiments shown and described in connection with FIG. 7.

As also shown in FIG. 14, the algorithm 1400 includes an act 1430 of generating a tuple-combination score for each of a plurality of tuple combinations. In particular, the act 1430 includes generating a tuple-combination score for each of a plurality of tuple combinations based on one or more of the following scoring factors: an object-label-confidence score, a color-compatibility score, an association value, a position weight, and a color-detail weight. This disclosure describes embodiments of each of the scoring factors above.

To illustrate, in some embodiments, the act 1430 includes using equation (5) or variations that include fewer scoring factors to generate a tuple-combination score for each of a plurality of tuple combinations, consistent with the disclosure above and as demonstrated by embodiments shown and described in connection with FIG. 8.

As also shown in FIG. 14, the algorithm 1400 optionally includes an act 1440 of selecting a diverse set of tuple combinations from among the plurality of tuple combinations. In particular, in some embodiments, the act 1440 includes creating an object graph comprising tuple nodes, edges, and weights, as described above. In some embodiments, the act 1440 includes applying equation (6) to iteratively select tuple nodes (and each selected tuple node's corresponding tuple combination) to create a diverse set of tuple combinations.

For example, the act 1440 includes creating an object graph demonstrated by and described in connection with FIGS. 9A and 9B.

As also shown in FIG. 14, the algorithm 1400 optionally includes an act 1450 of embedding the diverse set of tuple combinations within template messages. In particular, the act 1450 includes inserting elements of the tuple combinations (from the diverse set of tuple combinations) within placeholders of a template message. Consistent with the disclosure above, in some such embodiments, the template messages each include placeholders that correspond to each element of a tuple combination, such as one or more of an endorsed-product placeholder, a relative-position placeholder, a real-object-color placeholder, and a real-object-type placeholder that respectively correspond to an endorsed product, virtual object's relative position, real-object color, and real-object type of a tuple combination. In some embodiments, the act 1450 includes embedding elements of the diverse set of tuple combinations within template messages to create recommendation messages, such as the recommendation messages shown in FIGS. 10A-10D.

As also shown in FIG. 14, the algorithm 1400 includes an act 1460 of composing a digital message that recommends at least one endorsed product. In particular, the act 1460 includes composing a digital advertisement, an email, a text, a social media post, or a video that recommends at least one endorsed product. Additionally, in one embodiment, the act 1460 includes composing a digital message that includes instructions that cause a client device to present one or more endorsed products within an AR scene.

In one embodiment, the act 1460 includes composing a digital message that recommends an endorsed product based on the generated tuple-combination scores (e.g., a recommendation of the endorsed product corresponding to the tuple combination having a highest tuple-combination score or a recommendation of two different endorsed products corresponding to the tuple combinations having a first and second highest tuple-combination scores with different endorsed products). Additionally, in some embodiments, the act 1460 includes composing a digital message that includes one or more recommendation messages created in certain embodiments of act 1450.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as an un-subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing un-subscription model can be composed of various characteristics such as, for example, on-demand self-service, broad network access, resource pooling, rapid elasticity, measured service, and so forth. A cloud-computing un-subscription model can also expose various service un-subscription models, such as, for example, Software as a Service ("SaaS"), a web service, Platform as a Service ("PaaS"), and Infrastructure as a Service ("IaaS"). A cloud-computing un-subscription model can also be deployed using different deployment un-subscription models such as private cloud, community cloud, public cloud, hybrid cloud, and so forth. In this description and in the claims, a "cloud-computing environment" is an environment in which cloud computing is employed.

Figure 15:
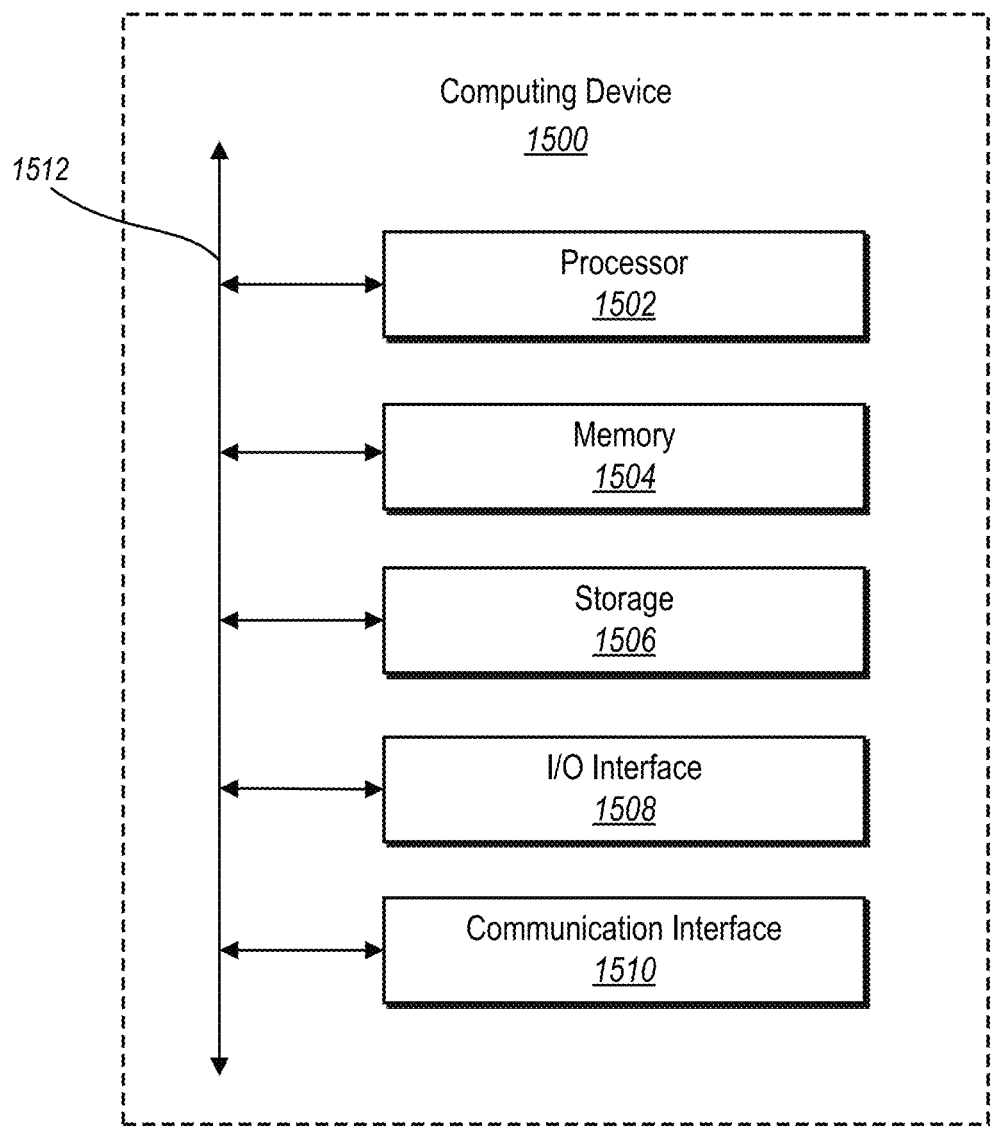
FIG. 15 illustrates a block diagram of a computing device in accordance with one or more embodiments.

FIG. 15 illustrates a block diagram of exemplary computing device 1500 that may be configured to perform one or more of the processes described above. As shown by FIG. 15, the computing device 1500 can comprise a processor 1502, a memory 1504, a storage device 1506, an I/O interface 1508, and a communication interface 1510, which may be communicatively coupled by way of a communication infrastructure 1512. In certain embodiments, the computing device 1500 can include fewer or more components than those shown in FIG. 15. Components of the computing device 1500 shown in FIG. 15 will now be described in additional detail.

In one or more embodiments, the processor 1502 includes hardware for executing instructions, such as those making up a computer program. As an example and not by way of limitation, to execute instructions for digitizing real-world objects, the processor 1502 may retrieve (or fetch) the instructions from an internal register, an internal cache, the memory 1504, or the storage device 1506 and decode and execute them. The memory 1504 may be a volatile or non-volatile memory used for storing data, metadata, and programs for execution by the processor(s). The storage device 1506 includes storage, such as a hard disk, flash disk drive, or other digital storage device, for storing data or instructions related to object digitizing processes (e.g., digital scans, digital models). For example, the memory 1504 can store the AR analysis database 1106.

The I/O interface 1508 allows a user to provide input to, receive output from, and otherwise transfer data to and receive data from computing device 1500. The I/O interface 1508 may include a mouse, a keypad or a keyboard, a touch screen, a camera, an optical scanner, network interface, modem, other known I/O devices or a combination of such I/O interfaces. The I/O interface 1508 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1508 is configured to provide graphical data to a display for presentation to a user. The graphical data may be representative of one or more graphical user interfaces and/or any other graphical content as may serve a particular implementation.

The communication interface 1510 can include hardware, software, or both. In any event, the communication interface 1510 can provide one or more interfaces for communication (such as, for example, packet-based communication) between the computing device 1500 and one or more other computing devices or networks. As an example and not by way of limitation, the communication interface 1510 may include a network interface controller ("NIC") or network adapter for communicating with an Ethernet or other wire-based network or a wireless NIC ("WNIC") or wireless adapter for communicating with a wireless network, such as a WI-FI.

Additionally, the communication interface 1510 may facilitate communications with various types of wired or wireless networks. The communication interface 1510 may also facilitate communications using various communication protocols. The communication infrastructure 1512 may also include hardware, software, or both that couples components of the computing device 1500 to each other. For example, the communication interface 1510 may use one or more networks and/or protocols to enable a plurality of computing devices connected by a particular infrastructure to communicate with each other to perform one or more aspects of the digitizing processes described herein. To illustrate, the image compression process can allow a plurality of devices (e.g., server devices for performing image processing tasks of a large number of images) to exchange information using various communication networks and protocols for exchanging information about a selected workflow and image data for a plurality of images.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A system for generating recommendations of endorsed products using characteristics extracted from augmented reality scenes comprising:
   a memory comprising a digital image of an augmented reality scene;
   a computing device comprising instructions thereon that, when executed by at least one processor, cause the system to:
   identify a real object and a virtual object within the augmented reality scene;
   based on visual information from pixels within the augmented reality scene, determine an object type and a color of the real object within the augmented reality scene;
   based on the object type and the color of the real object, select an endorsed product of a plurality of endorsed products to recommend for using with the real object by:
      determining a plurality of real-object tuples indicating the object type and color characteristics of the real object; and
      generating a tuple-combination score for each of a plurality of tuple combinations, wherein a tuple combination comprises a real-object tuple from the plurality of real-object tuples in combination with a particular endorsed product from the plurality of endorsed products; and
   generate, for display on the computing device, a product recommendation that recommends the selected endorsed product.

2. The system of claim 1, further comprising instructions that, when executed by the at least one processor, cause the system to select the endorsed product of the plurality of endorsed products to recommend for using with the real object by further:
   generating an object graph comprising a plurality of tuple nodes connected by a plurality of edges, wherein each of the plurality of tuple nodes represents a corresponding tuple combination of the plurality of tuple combinations;
   assigning the tuple-combination score for each of the plurality of tuple combinations to each of the plurality of tuple nodes;
   assigning a weight to each of the plurality of edges, wherein the weight assigned to each of the plurality of edges represents a similarity between a pair of connected tuple nodes of the plurality of tuple nodes; and
   selecting a diverse set of tuple combinations from among the plurality of tuple combinations based on the object graph.

3. The system of claim 2, further comprising instructions that, when executed by the at least one processor, cause the system to select the diverse set of tuple combinations from among the plurality of tuple combinations by:
   selecting a first tuple node of the plurality of tuple nodes, wherein the first tuple node has a highest tuple-combination score and corresponds to a first tuple combination of the plurality of tuple combinations;
   modifying the tuple-combination score assigned to each of a remaining plurality of tuple nodes of the plurality of tuple nodes based on the weight assigned to each of a set of edges of the plurality of edges that connect the first tuple node to the remaining plurality of tuple nodes;
   selecting a second tuple node of the remaining plurality of tuple nodes, wherein the second tuple node has a highest modified tuple-combination score and corresponds to a second tuple combination of the plurality of tuple combinations; and
   selecting the first tuple combination and the second tuple combination as part of the diverse set of tuple combinations.

4. The system of claim 3, further comprising instructions that, when executed by the at least one processor, cause the system to select the diverse set of tuple combinations from among the plurality of tuple combinations by:
   further modifying the modified tuple-combination score assigned to each of an additional remaining plurality of tuple nodes of the remaining plurality of tuple nodes based on the weight assigned to each of an additional set of edges of the plurality of edges that connect the second tuple node to the additional remaining plurality of tuple nodes;
   selecting a third tuple node of the additional remaining plurality of tuple nodes, wherein the third tuple node has a highest further modified tuple-combination score and corresponds to a third tuple combination of the plurality of tuple combinations; and
   selecting the first tuple combination, the second tuple combination, and the third tuple combination as part of the diverse set of tuple combinations.

5. A computer-implemented method comprising:
   identifying, by at least one processor, a real object and a virtual object within an augmented reality scene generated by a computing device;
   based on visual information from pixels within the augmented reality scene, determining, by the at least one processor, an object type and a color of the real object within the augmented reality scene;
   based on the object type and the color of the real object, selecting, by the at least one processor, an endorsed product of a plurality of endorsed products to recommend for using with the real object by:
    determining a plurality of real-object tuples indicating the object type and color characteristics of the real object; and
    generating a tuple-combination score for each of a plurality of tuple combinations, wherein a tuple combination comprises a real-object tuple from the plurality of real-object tuples in combination with a particular endorsed product from the plurality of endorsed products; and
generating, by the at least one processor for display on the computing device, a product recommendation that recommends the selected endorsed product.

6. The computer-implemented method of claim 5, further comprising, before identifying the real object and the virtual object within the augmented reality scene, determining, by the at least one processor, a viewpoint of the augmented reality scene that a user maintains for a threshold timeframe and identifying the real object and the virtual object within the determined viewpoint of the augmented reality scene.

7. The computer-implemented method of claim 5, wherein identifying the real object and the virtual object within the augmented reality scene comprises:
    applying, by the at least one processor, a Region-based Convolutional Neural Network to a digital image of the augmented reality scene; and
    generating, by the at least one processor, object proposals for each of the real object and the virtual object, the object proposals each comprising an object label and an object-label-confidence score.

8. The computer-implemented method of claim 5, further comprising:
    determining, by the at least one processor, a relative position of the virtual object with respect to the real object based on visual information from the augmented reality scene; and
    selecting, by the at least one processor, the endorsed product of the plurality of endorsed products to recommend for using with the real object based on the object type and the color of the real object and the relative position of the virtual object with respect to the real object.

9. The computer-implemented method of claim 5, wherein determining the color of the real object comprises determining, by the at least one processor, a shade and a hue of the real object.

10. The computer-implemented method of claim 9, wherein determining the color of the real object comprises determining, by the at least one processor, a dominant color of an object within a bounding box, wherein the bounding box surrounds the real object and the dominant color is expressed by a hex code.

11. The computer-implemented method of claim 5, wherein the real object comprises a plurality of real objects.

12. The computer-implemented method of claim 11, further comprising:
    generating, by the at least one processor, a plurality of recommendation messages that each recommend a different endorsed product of the plurality of endorsed products; and
    sending, by the at least one processor, a digital message comprising a recommendation message of the plurality of recommendation messages.

13. A non-transitory computer-readable medium storing instructions thereon that, when executed by at least one processor, cause a computing device to:
    identify a real object and a virtual object within an augmented reality scene;
    based on visual information from pixels within the augmented reality scene, determine an object type and a color of the real object within the augmented reality scene;
    based on the object type and the color of the real object, select an endorsed product of a plurality of endorsed products to recommend for using with the real object by:
        determining a plurality of real-object tuples indicating the object type and color characteristics of the real object; and
        generating a tuple-combination score for each of a plurality of tuple combinations, wherein a tuple combination comprises a real-object tuple from the plurality of real-object tuples in combination with a particular endorsed product from the plurality of endorsed products; and
    generate, for display on the computing device, a product recommendation that recommends the selected endorsed product.

14. The non-transitory computer-readable medium of claim 13, further comprising instructions that, when executed by the at least one processor, cause the computing device to determine a real-object tuple of the plurality of real-object tuples by determining the object type of the real object, the color of the real object, and the virtual object's relative position with respect to the real object.

15. The non-transitory computer-readable medium of claim 14, wherein the plurality of real-object tuples comprises:
    a first real-object tuple comprising a real-object type that identifies the object type of the real object, a real-object shade that identifies a shade of the real object, and the virtual object's relative position with respect to the real object; and
    a second real-object tuple comprising the real-object type, a real-object hue that identifies a hue of the real object, and the virtual object's relative position with respect to the real object.

16. The non-transitory computer-readable medium of claim 13, further comprising instructions that, when executed by the at least one processor, cause the computing device to select the endorsed product to recommend for using with the real object by:
    generating a color-compatibility score for each of a plurality of object-color combinations, the plurality of object-color combinations comprising the color of the real object in combination with each of a plurality of colors corresponding to each of the plurality of endorsed products; and
    based on a collection of scoring factors, generating a tuple-combination score for each of a plurality of tuple combinations, wherein the plurality of tuple combinations comprises each of the plurality of real-object tuples in combination with each of the plurality of endorsed products and wherein the collection of scoring factors comprise at least the color-compatibility score for each of the plurality of object-color combinations.

17. The non-transitory computer-readable medium of claim 16, further comprising instructions that, when executed by the at least one processor, cause the computing device to generate a first collection of scoring factors and a second collection of scoring factors by:

generating the first collection of scoring factors comprises generating each of:
- an object-label-confidence score corresponding to the real object;
- a first color-compatibility score corresponding to a first object-color combination of the plurality of object-color combinations between the color of the real object and a first color of a first endorsed product of the plurality of endorsed products;
- a first association value corresponding to an association between the real object and the first endorsed product;
- a first position weight corresponding to a relative position of the first endorsed product with respect to the real object; and
- a color-detail weight corresponding to the real object's color; and generating the second collection of scoring factors comprises generating each of:
- the object-label-confidence score corresponding to the real object;
- a second color-compatibility score corresponding to a second object-color combination of the plurality of object-color combinations between the color of the real object and a second color of a second endorsed product of the plurality of endorsed products;
- a second association value corresponding to an association between the real object and the second endorsed product;
- a second position weight corresponding to a relative position of the second endorsed product with respect to the real object; and
- the color-detail weight corresponding to the real object's color.

18. The non-transitory computer-readable medium of claim 16, further comprising instructions that, when executed by the at least one processor, cause the computing device to generate the color-compatibility score for each of the plurality of object-color combinations by applying a Lasso Regression model using a color palette.

19. The non-transitory computer-readable medium of claim 16, further comprising instructions that, when executed by the at least one processor, cause the computing device to select the endorsed product to recommend for using with the real object by selecting a diverse set of tuple combinations from among the plurality of tuple combinations.

20. The non-transitory computer-readable medium of claim 19, further comprising instructions that, when executed by the at least one processor, cause the computing device to generate the product recommendation as a plurality of recommendation messages by embedding the diverse set of tuple combinations within template messages, wherein each of the plurality of recommendation messages recommends a different endorsed product of the plurality of endorsed products.

* * * * *